US009098978B2

(12) United States Patent
Uchiyama et al.

(10) Patent No.: US 9,098,978 B2
(45) Date of Patent: Aug. 4, 2015

(54) GAME SYSTEM AND MANAGEMENT APPARATUS HAVING A CONVENIENT AUTHENTICATION PROCESS FOR ENSURING SECURITY

(75) Inventors: Takashi Uchiyama, Tokyo (JP); Yusuke Kitakaze, Tokyo (JP); Nobuhiro Goto, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 13/502,493

(22) PCT Filed: Aug. 9, 2010

(86) PCT No.: PCT/JP2010/063482
§ 371 (c)(1),
(2), (4) Date: Apr. 17, 2012

(87) PCT Pub. No.: WO2011/052278
PCT Pub. Date: May 5, 2011

(65) Prior Publication Data
US 2012/0214583 A1 Aug. 23, 2012

(30) Foreign Application Priority Data

Oct. 30, 2009 (JP) .................................. 2009-250048

(51) Int. Cl.
*A63F 9/24* (2006.01)
*H04L 9/00* (2006.01)
(Continued)

(52) U.S. Cl.
CPC ............ *G07F 17/3269* (2013.01); *A63F 13/70* (2014.09); *A63F 13/79* (2014.09);
(Continued)

(58) Field of Classification Search
CPC ............ G07F 17/3237; G07F 17/3239; G07F 17/3241; G07F 17/34; A63F 13/70; A63F 13/79; A63F 13/792

USPC ....................................................... 463/29, 42
See application file for complete search history.

(56) References Cited

U.S. PATENT DOCUMENTS 6,010,404 A    1/2000  Walker et al.
7,107,245 B1 * 9/2006  Kowalick ........................ 705/44
(Continued)

FOREIGN PATENT DOCUMENTS

CN   1749908 A    3/2006
CN   1831879 A    9/2006
(Continued)

OTHER PUBLICATIONS

Japanese Office Action corresponding to Japanese Patent Application No. 2011-538289, dated Dec. 11, 2012.
(Continued)

*Primary Examiner* — Lawrence Galka
(74) *Attorney, Agent, or Firm* — Sughrue Mion, PLLC

(57) ABSTRACT

A game system includes a management apparatus and a game device. The management apparatus includes an authentication section for obtaining results of authentications using first and second identifiers that should correspond to a user. When the results of the authentications are affirmative, a validity time limit is associated with the first identifier. In addition, the game device includes a confirmatory identifier acquirer for acquiring a confirmatory identifier that should correspond to the user, and an inquiry maker for making an inquiry asking the management apparatus to check whether or not the first identifier conforming to the confirmatory identifier is stored in the management apparatus. The inquiry inquires the management apparatus to check whether or not the validity time limit corresponding to the first identifier is a time after the present time when the first identifier conforming to the confirmatory identifier is stored in the management apparatus. A permitter of the management apparatus permits execution of a service associated with the first identifier used in the inquiry when results of checks by the manager in response to the inquiry are affirmative.

19 Claims, 10 Drawing Sheets

(51) Int. Cl.
*G07F 17/32* (2006.01)
*A63F 13/70* (2014.01)
*A63F 13/79* (2014.01)

(52) U.S. Cl.
CPC ........... *G07F 17/32* (2013.01); *G07F 17/3232* (2013.01); *G07F 17/3237* (2013.01); *G07F 17/3239* (2013.01); *G07F 17/3241* (2013.01)

(56) References Cited

U.S. PATENT DOCUMENTS

| | | | |
|---|---|---|---|
| 2004/0127287 | A1 | 7/2004 | Takahashi et al. |
| 2004/0146015 | A1* | 7/2004 | Cross et al. .................. 370/328 |
| 2005/0054438 | A1* | 3/2005 | Rothschild et al. ............. 463/29 |
| 2006/0077768 | A1 | 4/2006 | Tanimura |
| 2006/0085641 | A1* | 4/2006 | Multerer et al. ............. 713/168 |
| 2007/0050840 | A1* | 3/2007 | Grandcolas et al. .............. 726/5 |
| 2007/0066400 | A1 | 3/2007 | Kogo |
| 2007/0213122 | A1 | 9/2007 | Okada |
| 2009/0007250 | A1* | 1/2009 | Pouzin et al. ................... 726/10 |
| 2009/0132813 | A1* | 5/2009 | Schibuk ........................ 713/158 |
| 2009/0164786 | A1 | 6/2009 | Sekimoto et al. |

FOREIGN PATENT DOCUMENTS

| | | |
|---|---|---|
| GB | 2398512 A | 8/2004 |
| JP | 09-055018 A | 2/1997 |
| JP | 2002000911 A | 1/2002 |
| JP | 2004-222979 A | 8/2004 |
| JP | 2004-248922 A | 9/2004 |
| JP | 2005-334270 A | 12/2005 |
| JP | 2006187648 A | 7/2006 |
| JP | 2006-198372 A | 8/2006 |
| JP | 200782626 A | 4/2007 |
| JP | 2007-136072 A | 6/2007 |
| JP | 2007222502 A | 9/2007 |
| JP | 2008-049200 A | 3/2008 |
| JP | 2009-130750 A | 6/2009 |
| JP | 2009-253405 A | 10/2009 |

OTHER PUBLICATIONS

Nintendo, (Amusement Vision/Sega) 2003—'The official F-Zero GX website', Retrieve Date Apr. 4, 2014 from Internet URL—http://f-zero.com/ax-gx/index.jsp.; pp. 2; Snapshot Retrieve Date: Aug. 25, 2013 via Internet Wayback Machine.
IGN AU Feb. 20, 2003—'Hands On: F-Zero Arcade', Retrieved Date Apr. 4, 2014 from Internet http:// ign.com/articles/2003/02/20/hands-on-f-zero-arcade. pp. 10.
Australian Office Action dated Apr. 16, 2014 issued in Australian Application No. 2010312868.
Japanese Office Action issued in Japanese Patent Application No. 2011-538289 dated Nov. 12, 2013.
Communication dated Oct. 1, 2014, from the Australian Patent Office in counterpart Australian Application No. 2010312868.
Communication dated Sep. 16, 2014, from the State Intellectual Property Office of the People's Republic of China in counterpart Chinese Application No. 201080048589.2.
Microsoft Technet, "How the Kerberos Version 5 Authentication Protocol Works", Oct. 7, 2009, retrieved on Aug. 1, 2014, retrieved from Internet, URL: http://technet.microsoft.com/en-us/library/cc772815 (v=ws.10).aspx, 40 pages total.
Chinese Office Action dated Jan. 23, 2014 Issued in Chinese Application No. 201080048589.2.
Australian Office Action dated Feb. 25, 2014 issued in Australian Application No. 2010312868.

\* cited by examiner

| AUTHEN-TICATION FLAG | CARD ID NUMBER | PASSWORD | TIME LIMIT INFORMATION (VALIDITY TIME LIMIT) |
|---|---|---|---|
| | REGISTERED INFORMATION | | |
| 0 | C000100A | abcd1234 | ----- |
| 0 | C000101A | 1299xyz | ----- |
| 0 | C000252A | abcd1234 | ----- |
| 0 | C000945B | 1q84muryu | ----- |
| 0 | C001055B | 1922ozma | ----- |

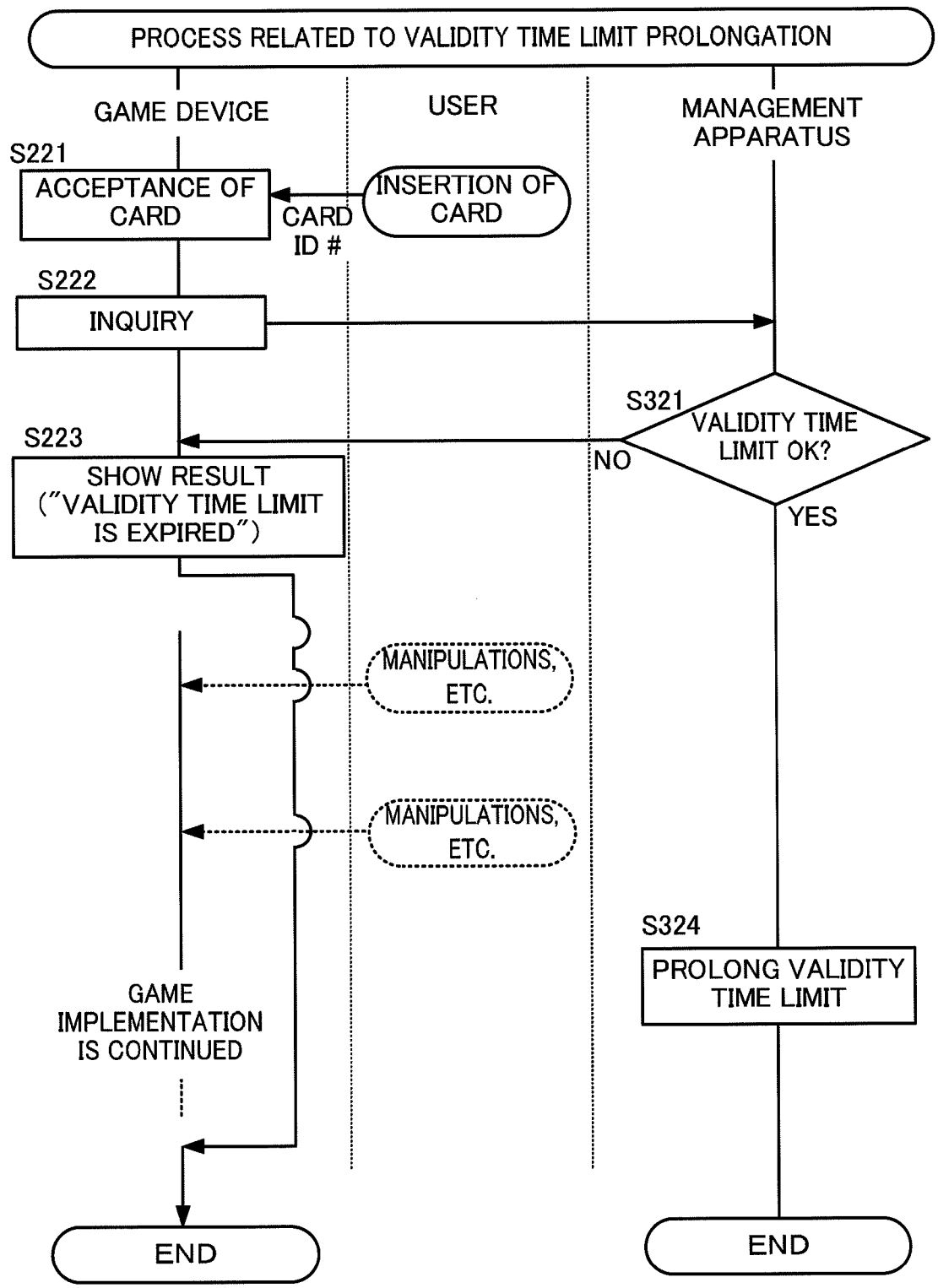

GAME SYSTEM AND MANAGEMENT APPARATUS HAVING A CONVENIENT AUTHENTICATION PROCESS FOR ENSURING SECURITY

CROSS REFERENCE TO RELATED APPLICATIONS

This application is a National Stage of International Application No. PCT/JP2010/063482 filed Aug. 9, 2010, claiming priority based on Japanese Patent Application No. 2009-250048 filed Oct. 30, 2009, the contents of all of which are incorporated herein by reference in their entirety.

TECHNICAL FIELD

The present invention relates to game systems and to management apparatuses.

BACKGROUND ART

Conventionally, game systems, each including a plurality of game devices and a management apparatus communicably connected to the game devices, have been provided. There is a known type of game system that confirms or authenticates the identity of individual users by using recording media, such as cards, in which unique IDs are recorded, and provides individualized services based on the results of the confirmation or authentication.

Such a type of game system is disclosed, for example, in Patent Document 1. Patent Document 1 discloses a technique for recording a game progress status uniquely given to each person in a recording medium, and for providing a service that enables to start a game on the basis of data retrieved from the recording medium when the person wants to start the game (see claims 8, etc., section [0056], etc., and FIG. 11, etc., of Patent Document 1). Since it is necessary to provide individualized services for different people, the system, of course, relies on the identity of each recording medium.

Patent Document 1: JP-A-2004-248922

SUMMARY OF THE INVENTION

The above-described game system has the following problems.

First, the technique in Patent Document 1 has a security problem. In the technique, the requirement for each individual in order to obtain the game progress status dedicated to that individual is merely the insertion of the recording medium of an individual. In other words, the authentication (or security) for confirming the user who can enjoy the service depends on the fact that the subject should possess the recording medium. As will be easily conceived, if the recording medium is found or stolen by a different person, that person can impersonate the true user who should enjoy the service. This cannot ensure security. Services in a game may include exchange of virtual points of each individual for virtual items in the game. The security problem may cause another serious problem in exchange of points.

This problem may be partially solved by requesting input of personal identification information, such as a password, known only to the individual, in addition to the insertion of the recording medium. However, this will cause different problems. First, whenever the player wants to enjoy the service, the player may be asked to execute a cumbersome manipulation including inputting the password. Secondly, all or some game devices may not include a device for inputting passwords, etc., as will be understood when it is attempted to add the authentication function to an existing game system. Accordingly, security is not ensured in all game devices, or there will be additional costs for providing devices for inputting passwords, etc., in all of the game devices.

The present invention was made in view of such problems, and an object of the present invention is to provide a game system and a management apparatus in which security for preventing misidentification of a person who can enjoy a service is ensured, and convenience for the users is not hampered or can be enhanced.

To solve the above-described problems, in a first aspect of the present invention, a game system includes a management apparatus and a game device, the management apparatus including: an authentication section adapted for obtaining results of authentications using a set of first and second identifiers that should correspond to a user; and a manager adapted for storing into a management storage section the first identifier and time limit information indicating a validity time limit associated with the first identifier when the results of the authentications are affirmative, the manager adapted for checking memory in the management storage section in response to an inquiry from the game device, the game device including: a confirmatory identifier acquirer adapted for acquiring a confirmatory identifier that should correspond to the user; an inquiry maker adapted for making an inquiry asking the manager to check whether or not the first identifier conforming with the confirmatory identifier is stored in the management storage section, the inquiry asking the manager to check whether or not the validity time limit indicated by the time limit information corresponding to the first identifier, is a time after the present time when the first identifier conforming with the confirmatory identifier is stored in the management storage section; and a permitter adapted for permitting execution of a service associated with the first identifier used in the inquiry by the inquiry maker when results of checks by the manager in response to the inquiry are affirmative.

In the present invention, first, an authentication is conducted by the management apparatus. In the authentication, identification of the user by the first identifier and the person inputting the second identifier is confirmed. Therefore, a subject who should not receive the service (i.e., a user who does not correspond to the first identifier) is prevented from receiving the service. In terms of this, security is ensured.

As described later, the "first identifier" depends on the structure of the first acceptor, and may be a certain piece of information recorded on the recording medium, or it may be a piece of biological information corresponding to the user (for example, a fingerprint). In the former case, the first identifier corresponds to the user since the first identifier is unique to the user's belongings (for example, the recording medium, more specifically, the card), whereas in the latter case, the first identifier is directly unique for the user. Consequently, the first identifier may be the user's identifier or the identifier for the user's belongings. In any case, the first identifier should correspond to the user.

The "second identifier" may be a password entered by the user, or a piece of biological information corresponding to the user (for example, a fingerprint). In any case, the second identifier should correspond to the user insofar as the person who enters the second identifier is a proper user. Since a set of the first and second identifiers is used in the authentication, the "second identifier" is different from the "first identifier" in type. For example, the first identifier is a piece of biological information, whereas the second identifier is a password.

The "confirmatory identifier" is the same as the first identifier in type. For example, if the first identifier is a piece of biological information, the confirmatory identifier is also the piece of biological information. Insofar as the person who enters the confirmatory identifier is a proper user, the confirmatory identifier should correspond to the user.

According to the present invention, when the confirmatory identifier acquirer in the game device acquires a confirmatory identifier, an inquiry related to the confirmatory identifier and the first identifier is made. On the basis of the results of checks by the manager in the management apparatus in response to the inquiry, provision of service is permitted or prohibited. The requirements for affirmation of the results of checks are that the first identifier has been authenticated, and the validity time limit indicated by the time limit information corresponding to the first identifier is after the time of inquiry, i.e., the present time.

Therefore, two advantageous effects can be achieved. First, insofar as the confirmatory identifier acquirer can acquire the confirmatory identifier having the same type as that of the first identifier, it is not necessary to accept information having the same type as that of the second identifier (or it is not necessary to have a structural element adapted for it). Secondarily, this means that individual users of the game system are required to only input the confirmatory identifier having the same type as that of the first identifier, and are not to required to input a piece of information having the same type as that of the second identifier. Accordingly, simplification of the structure of the game device is achieved, whereas convenience for the users can be enhanced since complicated manipulation is not necessary for users to accept provision of service.

Thus, the present invention can accomplish simultaneously two effects that are in a trade-off relationship, i.e., ensuring security and enhancing convenience for users.

In the present invention, the "first acceptor" may be any one of means for acquiring the first identifier. For example, the first acceptor may be a reader for reading a first identifier from a recording medium on which the first identifier is electrically or magnetically recorded, a reader for optically reading a first identifier printed on a surface, an input device for inputting a first identifier in response to user's manipulation, or a reader for reading a piece of biological information, such as the physiognomy, voice, fingerprint, pattern of the iris, or pattern of the veins of the user. This is also true of the "second acceptor".

In the present invention, the "authentication section" for obtaining results of authentications may be any one of means for obtaining results of authentications executed externally, or means for obtaining results of authentications executed by the authentication section itself.

Various elements or terms for defining the present invention will be described in detail with reference to an embodiment that is an example of the present invention. Especially, the meaning of "service" will be apparent from the description of the embodiment.

To solve the above-described problem, in a second aspect of the present invention, a game system includes a management apparatus and a game device, the management apparatus including: an authentication section adapted for obtaining results of authentications using a set of first and second identifiers that should correspond to a user; and a manager adapted for storing into a management storage section the first identifier and time limit information indicating a validity time limit associated with the first identifier when the results of the authentications are affirmative, the manager adapted for checking memory in the management storage section in response to an inquiry from the game device, the game device including: a confirmatory identifier acquirer adapted for acquiring a confirmatory identifier that should correspond to the user; and an inquiry maker adapted for making an inquiry asking the manager to check whether or not the first identifier conforming with the confirmatory identifier is stored in the management storage section, the inquiry asking the manager to check whether or not the validity time limit indicated by the time limit information corresponding to the first identifier is a time after the present time when the first identifier conforming with the confirmatory identifier is stored in the management storage section, the management apparatus further including a permitter adapted for permitting execution of a service associated with the first identifier used in the inquiry by the inquiry maker when results of checks by the manager in response to the inquiry are affirmative.

The second aspect of the present invention is basically the same as the first aspect, except that the "permitter" is included in the "management apparatus" in the second aspect whereas the "permitter" is included in the "game device" in the first aspect. Therefore, the second aspect can also accomplish simultaneously two effects that are in a trade-off relationship, i.e., ensuring security and enhancing convenience for users.

The difference between the second aspect and the first aspect in the location of the "permitter" leads to a difference in the flow of the process for executing the service. For example, in a general concept of the present invention, a "service providing device" for providing the service may be located separately from the management apparatus and the game device. In this case, according to the first aspect, the game device may receive a notification for executing service from the service providing device, but the permitter in the game device will determine whether or not the service is actually to be executed. If the "management apparatus" provides the "service", the game device may receive a notification for executing service from the management apparatus, but the permitter in the game device will also determine whether or not the service is actually to be executed. On the other hand, in the second aspect, since the permitter exists in the management apparatus and will determine whether or not the service is actually to be executed, if the "management apparatus" provides the service, it is not necessary to notify the game device of executing the service or to execute the service when the permitter in the management apparatus prohibits execution of service. In the second aspect, if service is provided by a "service providing device" located separately from the management apparatus and game device, failure of a notification for executing service from the service providing device to the game device or failure of execution of service at the service providing device may mean "prohibition" of execution of service.

The difference in the location of the "permitter" may be preferable when the permission is decided in conjunction with details of the "service". This point will be described in the description of a modification (1) of the embodiment.

In the first or second aspect, the manager may be adapted for updating the time limit information such that the validity time limit indicated by the time limit information with respect to a particular first identifier is prolonged when a predetermined requirement is satisfied with respect to the particular first identifier.

In this embodiment, since the predetermined requirement triggers prolongation of the validity time limit, undesirable occurrences that are not expected by the user, such as a sudden interruption of service, may be avoided if the predetermined requirement is determined suitably.

In general, in the present invention, even if the validity time limit has passed, the user can become a subject who can enjoy the service again by the aforementioned "authentication" at the management apparatus again. However, in this case, the user will be required to perform the manipulation for authentication at the management apparatus, i.e., re-entering the first and second identifiers. In this respect, in this embodiment, when the predetermined requirement is satisfied, the validity time limit is automatically prolonged, so that effort of re-inputting is not necessary for users. In order to realize the status in which it is as if the validity time limit is automatically prolonged, it is preferable that the "predetermined requirement" be determined as a "requirement" that can be satisfied by, for example, the existence of an act of unconscious manipulation by users.

Thus, this embodiment will effectively accomplish the effect of enhancing convenience for users.

In this embodiment, the predetermined requirement may include a fact that the results of checks by the manager in response to the inquiry for the particular first identifier are affirmative.

In this embodiment, when the results of checks by the manager in the management apparatus are affirmative (i.e., when the validity time limit associated with the first identifier matching the confirmatory identifier is confirmed to be after the present time), the validity time limit is prolonged. The affirmation of the results of inquiry is premised on the fact that the confirmatory identifier acquirer in a game device obtains the confirmatory identifier prior to (more preferably, directly before) the inquiry, so that the user may be at the game device, may be playing the game provided by the game device, or may almost start the game with high probability. In these situations, the validity time limit for the user is prolonged in this embodiment. Therefore, the user can enjoy the game without disturbance irrespective of the possibility of the expiration of the validity time limit in the course of the game. This effect can be understood as an effect for enhancing convenience.

More specific examples in which "the results of checks are affirmative" may be related to the structure of the "confirmatory identifier acquirer", and may include the following. First, if the "confirmatory identifier acquirer" is adapted for acquiring the confirmatory identifier only at a time point (for example, the time directly before starting the game), the example may be the fact in which the "checks" at this time point are affirmative. Secondarily, if the "confirmatory identifier acquirer" is adapted for acquiring the confirmatory identifier continuously or periodically, the example may be the fact in which the continuous or periodical checks in response to the continuous or periodical inquiry are affirmative.

Alternatively, in the embodiment in which the validity time limit is prolonged upon satisfaction of the predetermined requirement, the game system may include a determiner adapted for determining whether or not the game device is in play, in which the predetermined requirement may include a fact that the results of checks by the manager in response to the inquiry for the particular first identifier are affirmative, and a fact that the determiner determines that the game device that accepts entering the confirmatory identifier matching the particular first identifier is in play. In this embodiment, in addition to the fact that the results of checks are affirmative, if the game device that accepts entering the confirmatory identifier is in play, the validity time limit is prolonged. Accordingly, in this embodiment, since it is confirmed that the user is almost certainly playing the game provided by the game device, the above-described effect achieved by the embodiment described directly before can be more effectively achieved.

This embodiment can be used simultaneously with the above embodiment. In this case, the validity time limit is prolonged when (only) the requirement of the affirmation of the check results is satisfied, and also when this requirement and the requirement of in play are satisfied simultaneously. In general, the number of opportunities of prolonging of the validity time limit is not limited in the present invention, so that this embodiment in which the "predetermined requirement" is satisfied at multiple times falls with the scope of the present invention. The same is true of the embodiment described directly below.

In this embodiment, the "determiner" may be in a part of the "management apparatus" of the present invention, or in a part of the "game device". Alternatively, the determiner may be provided as an element located separately therefrom.

Alternatively, in the embodiment in which the validity time limit is prolonged upon satisfying of the predetermined requirement, the game device may include a recording medium holder adapted for holding a recording medium on which a recording medium identifier corresponding to the confirmatory identifier or the confirmatory identifier is recorded, in which the predetermined requirement may include a fact that the recording medium is held in the recording medium holder, and in which the permitter may be adapted for permitting execution of the service if the results of checks by the manager in response to the inquiry are affirmative and if the recording medium is held in the recording medium holder. In accordance with this embodiment, the first requirement ("requirement 1") for prolonging the validity time limit is that the recording medium is held at the "recording medium holder".

In this embodiment, permission for executing a service by the permitter depends on satisfying requirement 1 in addition to the affirmation of the check results by the manager in response to the inquiry. Consequently, in order that the user accept provision of service, the user should maintain the recording medium held in the recording medium holder.

An example of holding the recording medium by the recording medium holder is continuous holding of the recording medium at the recording medium holder. As long as the recording medium holder continually holds the recording medium, the user can accept the provision of service. The satisfaction of requirement 1 is in accord with the situation in which the confirmatory identifier can be read by the game device continuously (or periodically). If the identifier recorded in the recording medium is the confirmatory identifier, the satisfaction of requirement 1 is in accord with the situation in which the inquiry using the confirmatory identifier can be made continuously (or periodically). In view of this, continuous holding of a proper recording medium at the recording medium holder has a meaning that is almost the same as continuous affirmation of the results of checks by the manager in response to the inquiry (in other words, the requirement for permitting executing service is always satisfied).

In accordance with this embodiment, similarly to the embodiment described directly before, the above-described effect achieved by the embodiment described two descriptions before can be more effectively achieved. This is because the validity time limit for a user is prolonged when it is confirmed that the user is almost certainly playing the game provided by the game device. In addition, since the embodiment utilizes cooperation of the recording medium holder and the permitter, a preferable example of the structure that can provide service closely related to play of the game among various services is provided.

In the first or second aspect, a plurality of the game devices may be located, in which if the results of checks by the manager in response to the inquiry made by the inquiry maker of each of at least two game devices are affirmative, the permitter may be adapted for permitting execution of the service corresponding to the first identifier used in the inquiry by only one game device among the at least two game devices.

In accordance with this embodiment, double execution of services is prevented.

This embodiment is premised on the fact that results of checks by the manager in response to the inquiry made by each of at least two game devices are affirmative. It is contemplated that this fact may occur, for example, when the first acceptor accepts the IC card in which the first identifier is recorded that is borrowed or stolen by an improper user, or when the first acceptor accepts a unique password assigned uniquely to a user and the password is told to or spied by an improper user.

In this embodiment, when service is to be provided to a game device, it is necessary to decide a game device for which execution of service should be permitted, and the criteria for deciding it can be selected freely (for example, provision of service may be permitted for only the game device that has made the inquiry first among the inquiries of which the check results are affirmed by the manager.

In the present invention, the "permitter" may be located at either of the management apparatus or the game device as described above. If the permitter is located in the management apparatus, the permitter may select one game device to which service is to be provided, in accordance with a central administrative control function of the management apparatus. On the other hand, if the permitter is located in the game device, the permitter in the game device may decide whether or not execution of service is permitted on the basis of a network control, for example, whether or not a service-execution permission-or-prohibition signal is supplied from another game device. In this case, the criteria when the service-execution permission-or-prohibition signal is sent for prohibiting execution of service to another game device is the same as the criteria for deciding a game device for which execution of service should be permitted. Therefore, the criteria can be selected freely.

On the other hand, if the service is giving points associated with the first identifier on the basis of the results of the game, the points may be given on the basis of the results of the game in only one game device.

In a first aspect of the present invention, a management apparatus receives from a game device an inquiry involving an identifier that should correspond to a user, and sends back a check result to the game device in response to the inquiry. The management apparatus includes: an authentication section adapted for obtaining results of authentications using a set of first and second identifiers that should correspond to a user; and a manager adapted for storing into a management storage section the first identifier and time limit information indicating the validity time limit associated with the first identifier when the results of the authentications are affirmative, the manager adapted for checking memory in the management storage section in response to an inquiry from the game device, in which the manager is adapted for checking whether or not the first identifier conforming with a confirmatory identifier is stored in the management storage section in response to an inquiry from the game device, the inquiry involving a confirmatory identifier that should correspond to the user and is acquired at the game device, and in which the manager is adapted for checking whether or not the validity time limit indicated by the time limit information corresponding to the first identifier is a time after the present time when the first identifier conforming with the confirmatory identifier is stored in the management storage section.

This is an invention derived from observing the above-described game system of the first aspect of the present invention from another standpoint focused on a management apparatus. Accordingly, the management apparatus of the present invention can also accomplish simultaneously two effects that are in a trade-off relationship, i.e., ensuring security and enhancing convenience for users.

In a second aspect of the present invention, a management apparatus receives from a game device an inquiry involving an identifier that should correspond to a user, and determines to permit or prohibit execution of a service for the user in accordance with a check result in response to the inquiry. The management apparatus includes: an authentication section adapted for obtaining results of authentications using a set of first and second identifiers that should correspond to a user; a manager adapted for storing into a management storage section the first identifier and time limit information indicating the validity time limit associated with the first identifier when the results of the authentications are affirmative, the manager adapted for checking memory in the management storage section in response to an inquiry from the game device; and a permitter adapted for permitting execution of a service associated with the first identifier used in the inquiry by the inquiry maker when results of checks by the manager in response to the inquiry are affirmative, in which the manager is adapted for checking whether or not the first identifier conforming with a confirmatory identifier is stored in the management storage section in response to an inquiry from the game device, the inquiry involving a confirmatory identifier that should correspond to the user and is acquired at the game device, and in which the manager is adapted for checking whether or not the validity time limit indicated by the time limit information corresponding to the first identifier is a time after the present time when the first identifier conforming with the confirmatory identifier is stored in the management storage section.

This is an invention derived from observing the above-described game system of the second aspect of the present invention from another standpoint focused on a management apparatus. Accordingly, the management apparatus of the present invention can also accomplish simultaneously two effects that are in a trade-off relationship, i.e., ensuring security and enhancing convenience for users.

BRIEF DESCRIPTION OF THE DRAWINGS

FIG. 12 is a flow chart showing a process related to a validity time limit prolongation, similar to that of FIG. 5, in another game system in which the requirement for prolonging the validity time limit is only the affirmation of the result of the inquiry.

DESCRIPTION OF EMBODIMENTS

In the following, an embodiment of the present invention will be described with reference to FIGS. 1 and 2.

Figure 1:
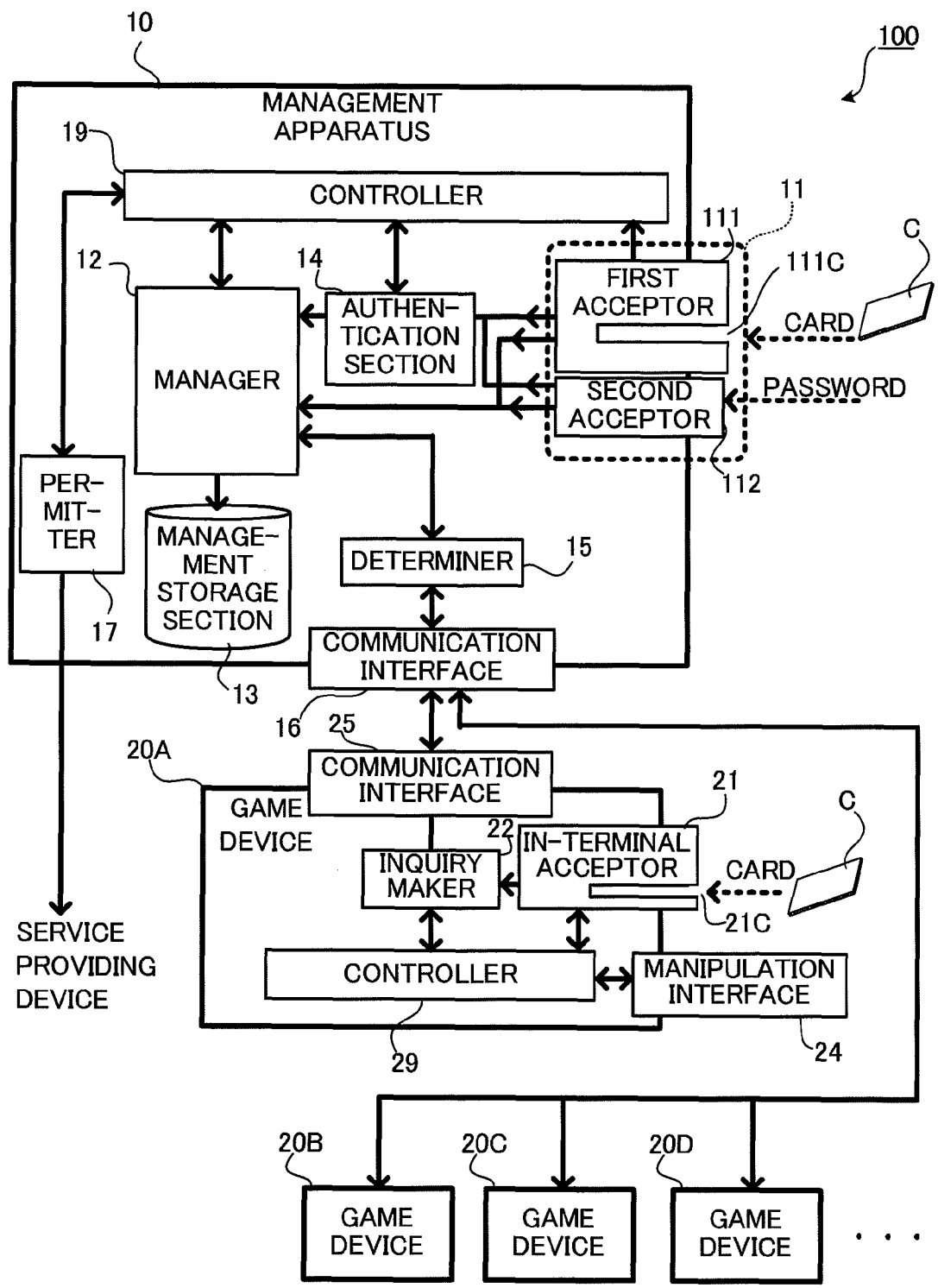
FIG. 1 is a block diagram showing a structure of a game system 100 according to an embodiment of the present invention.

As shown in FIG. 1, a game system 100 includes a management apparatus 10 and multiple game devices 20. The multiple game devices 20 are illustrated as multiple game devices 20A, 20B, 20C, . . . , but appendixes A, B, C, . . . will be omitted when it is unnecessary to distinguish the individual game devices. The management apparatus 10 and the multiple game devices 20 are preferably located in a game arcade.

Each game device 20 includes various elements, such as an in-terminal acceptor (confirmatory identifier acquirer) 21, an inquiry maker 22, a manipulation interface 24, a communication interface 25, and a controller 29.

The controller 29 includes a CPU (central processing unit), a RAM (random access memory), a ROM (read only memory), etc., although particulars are not shown. The controller 29 controls directly or indirectly other elements in the game device 20 in order that the entire game device 20 can harmonically operate.

The manipulation interface 24 is a device that accepts directly manipulation by the user (player) for prompting the user to play a game. The term, "game" is meant to include, for example, a slot machine game, a puzzle game, a coin pusher game (medal pusher game), a horse racing game, and a mahjongg game, and for the present invention, the type of game is not limited. Manipulations by the user at the manipulation interface 24 depend on the type of game. The type of manipulation interface 24 also depends on the type of game. For example, when the game is a slot machine game, the manipulation interface 24 includes various buttons, etc., for instructing operation (stop, etc.) of electromagnetic or mechanical reels.

In this embodiment, when the user wants to participate in the game being conducted in the game device 20, the user should drop a medal (not shown) into a predetermined slot (not shown) included in the manipulation interface 24. In this specification, the term "medal" is a piece in the shape of a disc and may also be called a token coin or simply a coin. For example, when the game is a coin pusher game, insertion of a medal means obtaining qualification to participate in the game as a player and simultaneously is a part of playing the game. If a player performs well in the game, a number of medals are paid as a reward for play, and the number of medals paid usually depends on the number of medals inserted, and is greater than the number of medals inserted.

In the present invention, the game devices 20A, 20B, 20C, . . . may correspond to types of games, respectively, but all or some of game devices 20A, 20B, 20C, . . . may provide a single type of game. Although this exemplary embodiment uses medals as described above, the present invention is not limited to this embodiment.

The in-terminal acceptor 21 accepts inputting of a confirmatory identifier. In this embodiment, a card C (see FIG. 1) given to each user that can use the game system 100 is utilized for inputting the confirmatory identifier. Each card C stores a card ID number as the confirmatory identifier uniquely assigned to the card C. The manner for recording the card ID number is not limited, and may be an electronic or magnetic recording, barcoding, or writing into an IC chip embedded in the card. That is to say, the card C may be an IC card or another type of information storage card.

As shown in FIG. 1, the in-terminal acceptor 21 includes a card holder 21C (recording medium holder) for conforming to the use of the card C. When the card holder 21C accepts the card C, the card holder 21C accepts input of the card ID number recorded in the card C (and should correspond to the user owning the card C. The manner for accepting input of the information or for reading the information depends on the above-described manner for recording the information in the card C (for example, if the card ID number is recorded as a barcode, the card holder 21C will optically read the barcode. Thus, the in-terminal acceptor 21 accepts, from a user, input of a confirmatory identifier that should correspond to the user.

The card holder 21C according to the embodiment can hold the card C continuously. In this embodiment, the card holder 21C continuously reads the card ID number recorded on the card C while the card C is held continuously in the card holder 21C.

The card ID number of the card C read by the card holder 21C is used by a permitter 17 of the management apparatus 10 for determining whether or not to permit execution of a "service" for the user. In this embodiment, the term "service" is a service provided to the user during the playing of the game, rather than playing of the game per se. In the game device 20, the user can play the game regardless of insertion of the card C of the user into the in-terminal acceptor 21, but the user can enjoy the service only when the card C of the user is inserted into the in-terminal acceptor 21.

The inquiry maker 22 may be, for example, a function achieved by execution of a program that will be described later at the controller 29. The inquiry maker 22 transmits results of the continuous reading at the card holder 21C to the management apparatus 10. More specifically, as long as the card C is held at the card holder 21C, the inquiry maker 22 continually transmits a signal indicating the card ID number recorded on the card C to a manager 12 of the management apparatus 10. When the inquiry maker 22 informs the manager 12 in the management apparatus 10 of the card ID number read at the in-terminal acceptor 21, the inquiry maker 22 makes an inquiry asking the manager 12 of the management apparatus 10 to check whether or not the reading time point is before a validity time limit with respect to the card ID number. The manager 12 checks whether or not the number conforming to the card ID number is stored in a management storage section 13. When the number conforming with the card ID number is stored in a management storage section 13, the manager 12 checks whether or not the validity time limit corresponding to the card ID number is a time after the present time. Thus, the inquiry maker 22 has a close cooperative relationship with the management apparatus 10, and will be described in detail in later explanation of the manager 12 and the management storage section 13 of the management apparatus 10. The meaning of the "validity time limit" will be also described in later explanation of the manager 12 and the management storage section 13 of the management apparatus 10.

The communication interface 25 is an interface for communicating with the management apparatus 10. The transmission via the communication interface 25 from the game device 20 to the management apparatus 10 includes the card ID number sent from the inquiry maker 22. The transmission via the communication interface 25 from the management apparatus 10 to the game device 20 includes a response to the inquiry. In this embodiment, the communication interface 25 operates depending mainly on instructions for requesting communication by the game device 20. However, communication originated from the side of the management apparatus 10 may be conducted without any problem. In this embodiment, the management apparatus 10 originates communication in order to confirm whether or not play is being conducted ("in play") at the game device 20, as will be described later.

On the other hand, the management apparatus 10 includes various elements, such as an acceptor 11, a manager 12, a management storage section 13, an authentication section 14, a determiner 15, a communication interface 16, a permitter 17, and a controller 19. The manager 12, the authentication section 14, the determiner 15, and the permitter 17 may be, for example, functions achieved by execution of a program that will be described later at the controller 19.

The controller 19 includes a CPU, a RAM, a ROM, etc., although particulars are not shown. The controller 19 controls directly or indirectly other elements in the management apparatus 10 in order that the entire management apparatus 10 (and thus the entire game system 100) can harmoniously operate. The communication interface 16 is an element for communicating with the communication interface 25 of each game device 20, i.e., an interface for communicating with each game device 20.

As shown in FIG. 1, the acceptor 11 includes a first acceptor 111 and a second acceptor 112.

The structure and the function of the first acceptor 111 may be substantially the same as those of the above-described in-terminal acceptor 21 as shown in FIG. 1. More specifically, the first acceptor 111 includes a card holder 111C, which accepts a card C inserted therein and reads the card ID number recorded on the card C, in which the card ID number corresponds to the user who has inserted the card C into the card holder 111C. However, the function of the first acceptor 111 is not completely the same as that of the in-terminal acceptor 21. For example, the first acceptor 111 is not used for permission of playing the game in which a service is executed. The first acceptor 111 accepts input of a first identifier corresponding to a user from the user.

In the specification, the card ID number recorded on the card C is called a "first identifier" in conjunction with the acceptor 11, and is called a "confirmatory identifier" in conjunction with the in-terminal acceptor 21. However, the first identifier and the confirmatory identifier are the same piece of information in character and in form.

The second acceptor 112 accepts, from a user who utilizes the game system 100, inputting a password (that should correspond to the user) determined by the user freely as a second identifier. In order to accept inputting of passwords, the second acceptor 112 includes an input interface, for example, a keyboard, a numeric keypad part on a usual keyboard, an alphabetic keypad part on a common keyboard, or a touch panel.

The manager 12 manages the card ID number and the password entered via the acceptor 11. For the management, the manager 12 utilizes the management storage section 13, etc. The management storage section 13 stores the card ID number and the password in a predetermined criterion in which the card ID number and the corresponding password are associated with each other. The management storage section 13 is, for example, a hard disk or other information recording medium.

Thus, the management storage section 13 stores the card ID number and the password as a registered information set. The registered information set (or the existence thereof) has a significance that it gives to the user a (potential) qualification as a subject who can enjoy the "service" that will be described later.

Figures 2, 3:
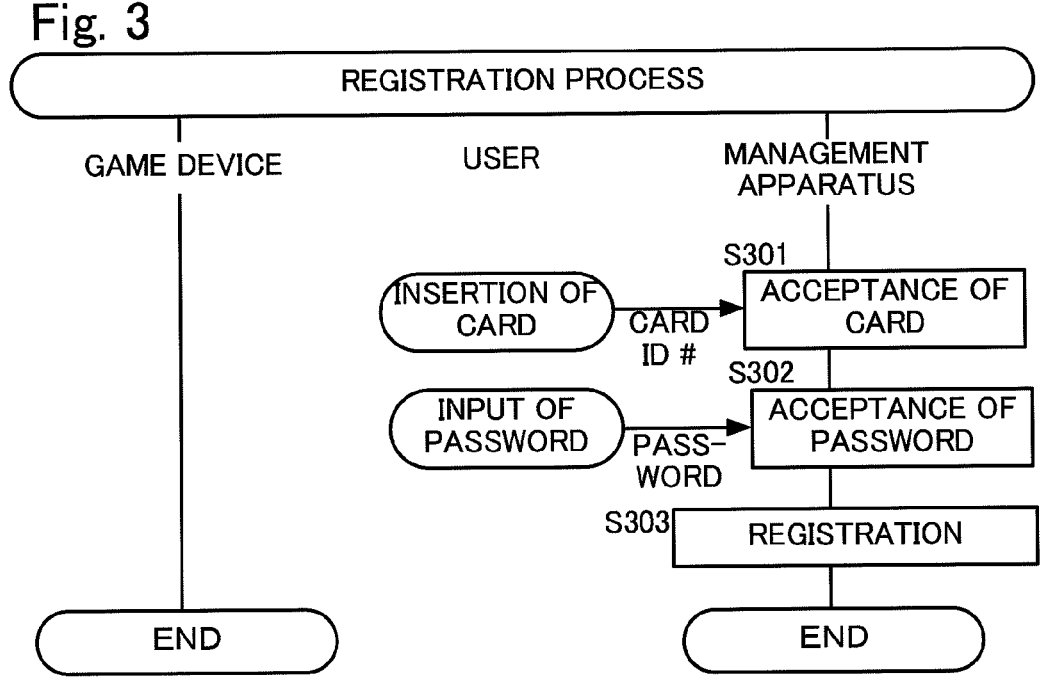
FIG. 2 is an explanatory diagram showing specific examples of first identifiers (card ID numbers) and second identifiers (passwords)
FIG. 3 is a flow chart showing a registration process.

FIG. 2 shows specific examples of card ID numbers and passwords used as the registered information sets. In this embodiment, the card ID number has a form of "CxxxxxxY", in which x is 0, 1, 2, . . . , or 9, whereas Y is "A" or "B", and in which the values may represent various meanings. The password is defined to have a form of a combination of lower case letters of the alphabet and Arabic numerals, and it is not to exceed nine characters in length. Although the password may be determined by the user freely as described above, of course, it should satisfy the predetermined format. Since the password is an identifier that each user can freely decide, a password of one person may accidentally match the password of another person. In FIG. 2, both the passwords on the first and third lines are "abcd1234" coincidentally.

The management storage section 13 stores the card ID number and the password as an authenticated information set. The term "the card ID number and the password as an authenticated information set" means that a set of a card ID number and a password is accompanied with an index indicating that they have been authenticated. The index indicating that they have been authenticated may be, for example, an authentication flag or time limit information, which will be described later.

In order that a card ID number and a password have a characteristic as an authenticated information set, the set of the card ID number and the password entered via the acceptor 11 should match a registered information set of a card ID number and a password that is registered at a given time. That is to say, it is necessary that the set of the card ID number and the password have been authenticated (it is necessary that the authentication be affirmative). More exactly, "match" or "authenticated" involves:

first, if the card ID number entered by the user is sought in the management storage section 13, the same card ID number is found in one of registered information sets; and second, when the same card ID number is found by the a search, the password entered together with the card ID number that is known only by the user is in accord with the password associated with the card ID number found by the search. The authentication section 14 shown in FIG. 1 executes such authentication. In order to distinguish whether or not the information set has been authenticated, the authentication flag shown in FIG. 2 is set or reset for each registered information set. In the examples shown in FIG. 2, no registered information sets have been authenticated (compare with FIG. 6, which will be referred to later).

Figure 6:
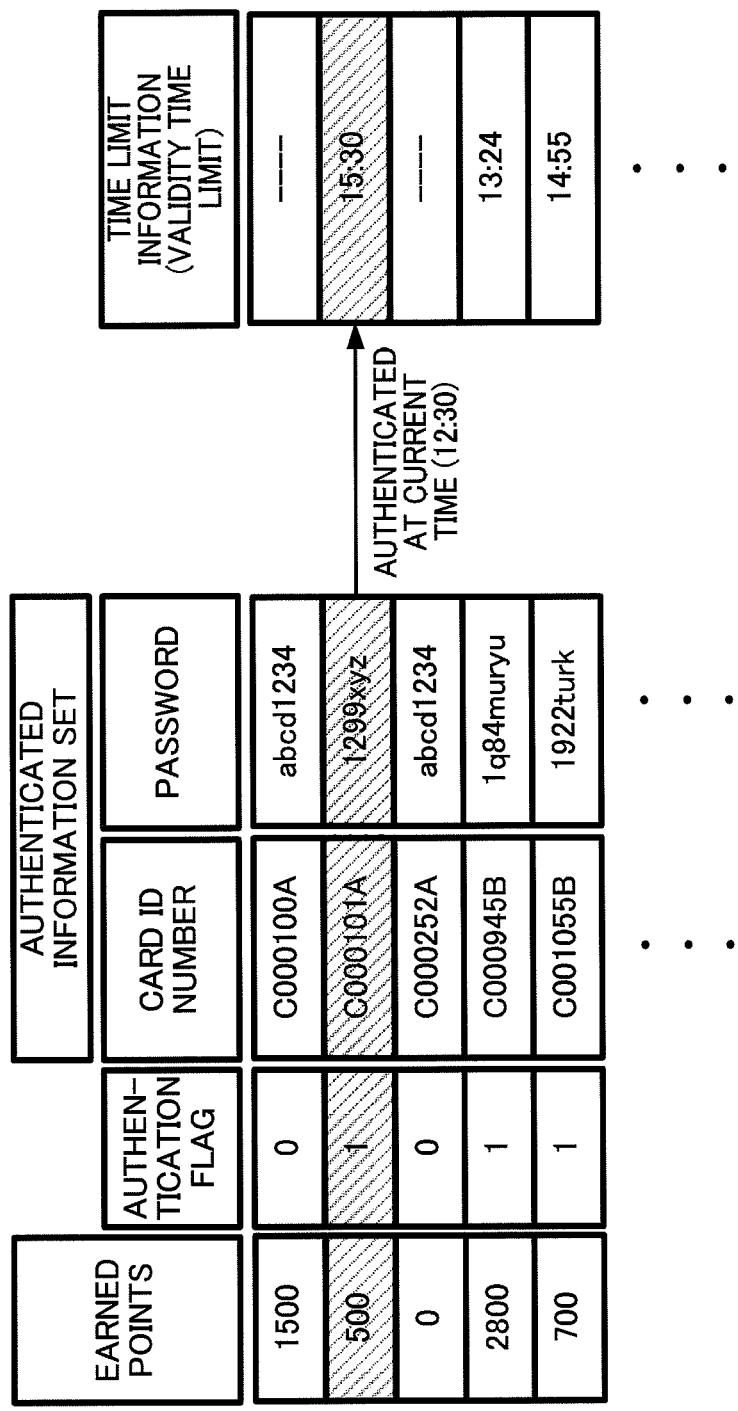
FIG. 6 is an explanatory diagram for explaining examples of registered information sets to which characteristics of authenticated information sets are given as a result of the authentication process shown in FIG. 5, and an example in which time limit information is associated with an authenticated information set.

The management storage section 13 stores time limit information indicating a validity time limit associated with each authenticated information set together with the authenticated information set constituted of the card ID number and the password (compare FIG. 2 with FIG. 6). The validity time limit has a meaning that expresses an end time of the duration in which the authentication is effective. In other words, if the present time is prior to the validity time limit, the registered information set constituted of the card ID number and the password still has the characteristic of an authenticated information set. Otherwise, the registered information set looses the characteristic (in this case, the registered information set is returned to have only the characteristic of a registered information set).

For example, the authentication flag indicating that the card ID number and the password are authenticated is reset for the card ID number and the password for which the validity time limit has passed. However, since the time limit information is associated with all of authenticated information sets, if a set of a card ID and a password is accompanied with time limit information, the set can be considered as the authenticated information set. Accordingly, existence or non-existence of the time limit information can be substituted for the above-described authentication flag. If existence or non-existence of the time limit information is actually substituted for the authentication flag, it is unnecessary to provide the authentication flag.

On the basis of the above-described distinction and criteria, the manager 12 determines how to treat the card ID number and the password entered. In addition, on the basis of the above-described distinction and criteria, the manager 12 instructs the management storage section 13 to store the card ID number and the password (and the time limit information if appropriate).

The above-described inquiry maker 22 asks the manager 12 of the management apparatus 10 to check whether or not the card ID number read at the in-terminal acceptor 21 exists in authenticated information sets among registered information sets stored in the management storage section 13 of the management apparatus 10. More specifically, the inquiry maker 22 makes an inquiry asking the manager 12 to check whether or not a card ID number (the first identifier) matching the card ID number (confirmatory identifier) read by the in-terminal acceptor 21 is stored in the management storage section 13, and to check whether or not the validity time limit of the time limit information corresponding to the first identifier is after the present time point if the first identifier matching the confirmatory identifier is stored in the management storage section 13. In response to the inquiry from the inquiry maker 22 of the game device 20, the manager 12 checks memory in the management storage section 13. The results of the inquiry are affirmative (the check results are affirmative) when (i) the card ID number is stored in a registered information set at the management storage section 13, (ii) the card ID number is stored in an authenticated information set at the management storage section 13, and (iii) the present time, i.e., the inquiry time point is before the validity time limit for the authenticated information set. If requirement (ii) is satisfied, requirement (i) is inevitably satisfied. Accordingly, in this embodiment, the inquiry maker 22 confirms whether or not a card ID number (the first identifier) matching the card ID number (confirmatory identifier) read by the in-terminal acceptor 21 is stored in the management storage section 13, and confirms whether or not requirement (iii) with respect to the validity time limit is satisfied. The inquiry maker 22 receives from the management apparatus 10 a notification indicating whether or not the results of checks at the manager 12 of the management apparatus 10 are affirmative. More specifically, the inquiry maker 22 receives a notification indicating that the inquiry result is affirmative if the card ID number read by the in-terminal acceptor 21 is stored in management storage section 13, and if the validity time limit is after the present time (i.e., the present time is before the validity time limit).

If the management storage section 13 does not store the card ID number (the first identifier) matching the card ID number (confirmatory identifier) read by the in-terminal acceptor 21, the management apparatus 10 transmits to the inquiry maker 22 information that the card ID number is not stored in the management storage section 13. If the validity time limit is before the present time, the management apparatus 10 transmits to the inquiry maker 22 information indicating that the validity time limit has expired.

In this embodiment, the management storage section 13 is a part of the management apparatus 10, but the present invention is not limited to the embodiment. The management storage section 13 may be provided as a different element or an external unit for the management apparatus 10.

In this embodiment, the management storage section 13 stores the registered information sets, authenticated information sets, and time limit information, but the present invention is not limited to the embodiment. For example, if there is a management apparatus higher than the management apparatus 10, the higher management apparatus may store the registered information sets (including card ID numbers and passwords). In this case, the management storage section 13 of the management apparatus 10 may still store the authenticated information sets (including card ID numbers and passwords).

As mentioned above, the authentication section 14 executes authentication for recording the card ID number and the password as the authenticated information set.

The determiner 15 determines whether the game device 20 is in play or not. This determination is executed for each of the game devices 20A, 20B, 20C, . . . . The term "in play" means that a user is playing the game provided by a game device 20 at the game device 20. The specific mode of "in play" is not determined easily since it depends on the type of game. For example, according to one of the following criteria, it may be decided whether or not the device is "in play".

First, it may be decided whether or not the device is "in play" or not, depending on whether or not the present time is within a period starting from the time point at which the game start button on the manipulation interface 24 of the game device 20 is pushed and ending at the time point at which a result of the game occurs.

Second, it may be decided whether or not the device is "in play" or not, depending on whether or not a medal is consumed at the game device 20 or the number of consumed medals is equal to or greater than a predetermined number, e.g., one within a period having a time length before present time, in which the consumption of medal may include dropping in the medal. In this case, if the period is set short, it is determined that the user is playing the game at the game device right now. The term "consumption" of a medal means a fact that the medal itself dropped into the game device cannot be returned to the user, and that the participation in the game is fixed. For example, if the game device 20 provides a horse racing game, the "consumption" of a medal is established by three facts, i.e., dropping in the medal, betting on an expected winning horse, and nonoccurrence of canceling before racing horses enter the starting gate. Depending on the type of game or tools used in the game other than medals, the type and the number of requirements for establishment of the "consumption" may vary. In any event, the fact of whether or not the "consumption" is conducted (i.e., whether or not the device is "in play" or not) is determined by a synthesized judgment depending on specific facts, rather than merely dropping in a medal.

In this embodiment, the determiner 15 is a part of the management apparatus 10, but the present invention is not limited to the embodiment. The point is that the game system 100 can understand whether or not play is performed at each game device 20. Accordingly, an element corresponding to the determiner 15 may be located in each game device 20, and the determination result may be reported via the communication interfaces 25 and 16 to the management apparatus 10.

When the results of the checks by the manager 12 in response to the inquiry made by the inquiry maker 22 in the game device 20 are affirmative (when the card ID number of the card inserted into the game device 20 at the present time point is stored in the management storage section 13 and when the validity time limit for the card ID number is after the present time point), the permitter 17 permits execution of a service. Thus, the validity time limit for the card ID number and the password is also a validity time limit for executing a service. However, in this embodiment, for executing a service, one or more requirements are needed. This will be described later in the explanation of requirements [β], etc. The term "service" generally means a privilege (excluding play of the game) given to the user owning the card C in which the card ID number is stored. More specifically, the service may include the following examples.

The first example of the "service" may be giving a privilege depending on the type of game provided by the game device 20. For example, if the game device 20 provides a role playing game, a force item, e.g., a weapon or information on tricks that are never given to a user as a normal reward, may be given to a user. It may be determined whether or not such a privilege is given depending on the amount of play. The term "amount of play" is an amount accumulated depending on the total number of medals consumed or acquired by the user, for example, at the present time point. Simply, the amount of play may be proportional to the amount of consumption or the amount of acquisition. Of course, other parameters (for example, an achievement in the game) may be used. In addition, the amount of play is not limited to be proportional to the amount of consumption or the amount of acquisition. In any event, the "amount of play" is defined as a degree of contribution of an individual user to the amount of takings in the game system 100.

The second example of a "service" may be restitution to the game progress status that a user enjoyed up until a particular time. For example, if the game device 20 provides a role playing game, and if a user progressed the game to a specific scene, the scene may be restored in front of the user promptly when the user starts to play the same game on a game device that provided the game at a later date. It will be apparent that this action has a significance as a privilege (i.e., service) if compared with the situation in which the user starts from the initial stage of the game.

The third example of "service" may be giving points depending on the amount of play. The term "amount of play" has the meaning described above. The "point" is an amount that can be substituted for a medal. For example, a user can obtain new medals in exchange for a certain amount of points possessed by the user without paying money. Therefore, the "service" in this case can be specifically considered to be a privilege given to a user for playing a game, in which the user who contributes to more sales in the game system 100 can play the game more. As described above, the "point" may be substituted for a medal, but the "point" may have a meaning of an amount that can satisfy the user's sense of mastery simply.

This embodiment will be described hereinafter, with the prospect that the service of the third example is provided to the user.

When the permitter 17 permits execution of the service, the service is executed by, for example, a service providing device (not shown) that can exist separately from the management apparatus 10 and the game device 20 as shown in FIG. 1. However, an element for actually executing the service ("service providing device" in FIG. 1) may be, of course, located in the management apparatus 10 or the game device 20.

The game system 100 according to the embodiment described above operates as in the following. The operation will be described with reference to FIG. 3 and subsequent drawings in addition to FIGS. 1 and 2. In the game system 100 according to the embodiment, various processes including a game implementation process at the game device 20 may be executed in parallel, but in the following, processes that are particularly related to the present invention will be mainly described for simplifying description.

Registration Process

First, description will be made how to execute a registration process for each user in the embodiment. Each of the processes described below is executed in accordance with a program stored in an information recording medium, such as a RAM or a ROM in the controller 19 of the management apparatus 10 or in the controller 29 of the game device 20. The information recording medium may be a CD (compact disc), DVD (digital versatile disc), or other type of medium.

As shown in FIG. 3, in the registration process, the first acceptor 111 of the acceptor 11 of the management apparatus 10 accepts insertion of the card C, and reads the card ID number recorded on the card C (step S301 in FIG. 3). In addition, the second acceptor 112 of the acceptor 11 accepts the input of the password (step S302 in FIG. 3). Then, the manager 12 associates the card ID number and the password with each other, and stores (i.e., registers) the card ID number and the password as a registered information set in the management storage section 13 (step S303 in FIG. 3). Details of the registration are shown in FIG. 2, to which reference has already been made. For facilitating the registration, a guidance that invites the user to push a registration button, which may be located near the second acceptor 112, may be used. As will be apparent from FIG. 3, the game device 20 is not involved in the registration process.

Since the card C should be possessed by each of the rightful users, the card ID number recorded on the card C should correspond to the user. In addition, the password is determined by each user freely. Thus, a set of a card ID number and a password indicates a particular user. A user may own multiple cards, but even in such a case, a set of a card ID number among card ID numbers of the multiple cards and a password corresponding to the card ID number indicates (i.e. corresponds to) the user. In any event, by virtue of the registration, a (potential) qualification as a subject who can enjoy the "service" provided by the game system 100 is given to the user identified by the card ID number and the password that have been registered.

Authentication Process

Next, description will be made of how to execute a registration process for each user in the embodiment.

Figure 4:
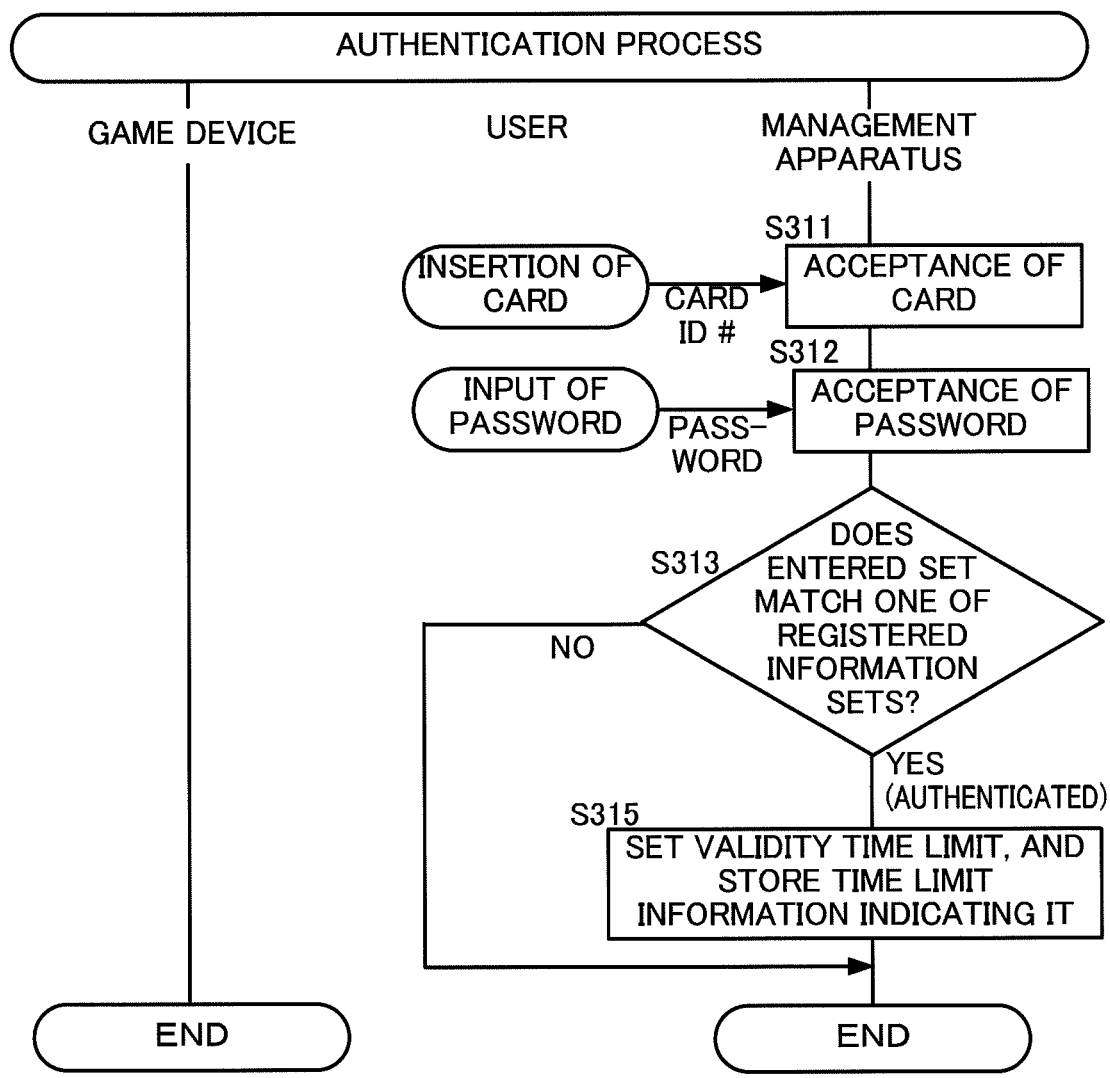
FIG. 4 is a flow chart showing an authentication process.

In a manner similar to the registration process shown in FIG. 3, in the authentication process shown in FIG. 4, the card ID number is read by the first acceptor 111 of the acceptor 11 of the management apparatus 10 (step S311). In addition, the input of the password is accepted by the second acceptor 112 of the acceptor 11 (step S312 of FIG. 4).

Next, the authentication section 14 confirms whether or not the entered combination of the card ID number and the password matches one of multiple sets (registered information sets existing at this time) each consisting of a card ID number and a password (step S313 of FIG. 4). (The procedure for confirming matching has been described in conjunction with the above description of the authenticated information set). If there is no matched combination, since the authentication is denied, the authentication process ends (in FIG. 4, from step S313 via NO to END). If there is a matched combination, since the authentication is affirmative, the process proceeds to the next step (in FIG. 4, from step S313 via YES to step S315). In the latter case, the characteristic of an authenticated information set is given to the matched registered information set, whereas a validity time limit unique to the authenticated information set is set, and the time limit information indicating the validity time limit is stored in the management storage section 13 together with the authenticated information set. As will be apparent from FIG. 4, the game device 20 is not involved in the registration process.

FIG. 6 shows specific examples of card ID numbers and passwords used as the authenticated information sets. As shown in FIG. 6, at the current time (12:30), the authentication flag "1" is set for a registered information set of the card ID number and the password on the second line. That is to say, the registered information set is, in turn, stored as authenticated information set. Correspondingly, time limit information indicating a validity time limit "15:30" associated uniquely with the authenticated information set is stored in the management storage section 13. Thus, in this embodiment, the validity time limit is the time that is three hours after the current time. It should be noted that FIG. 6 shows that the registered information sets on the fourth and fifth lines have already been authenticated.

By virtue of the authentication, the user that is identified by the card ID number and the password that have been authenticated obtains a qualification to enjoy playing at one of the game devices 20 and to actually accept the service corresponding to the user (i.e., unique to the card ID number) and corresponding to the play.

Process Related to Validity Time Limit Prolongation

Next, description will be made how to execute a process related to prolongation for the validity time limit for each user in the embodiment.

Figure 5:
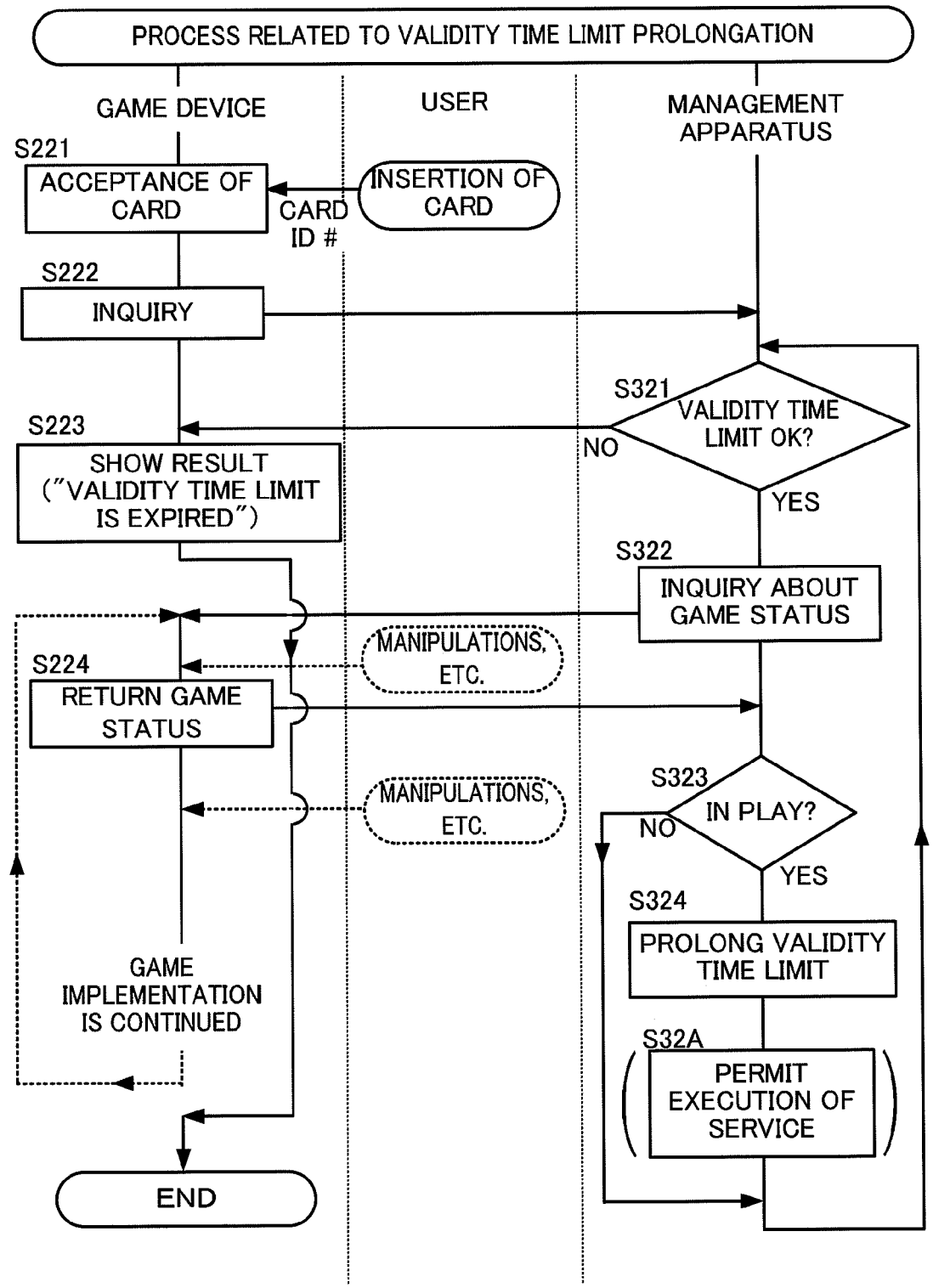
FIG. 5 is a flow chart showing a process related to a validity time limit prolongation.

In this process, as shown in FIG. 5, the in-terminal acceptor 21 of the game device 20 accepts insertion of the card C, and reads the card ID number recorded on the card C (step S221 in FIG. 5). It should be noted that in contrast to the authentication process, the user is not required to enter the password in this process. Furthermore, the card C is inserted into the in-terminal acceptor 21 of the game device 20, rather than the acceptor 11 of the management apparatus 10. As described above, the user can play the game at the game device 20 regardless of insertion of the card C of the user into the in-terminal acceptor 21.

Then, the inquiry maker 22 of the game device 20 makes an inquiry to the manager 12 of the management apparatus 10 about the read card ID number (step S222 in FIG. 5). In response to the inquiry from the inquiry maker 22 of the game device 20, the manager 12 checks memory in the management storage section 13 to confirm whether or not a card ID number (first, identifier) conforming with the card ID number read by the in-terminal acceptor 21 (confirmatory identifier) is stored in the management storage section 13, and to confirm whether or not the validity time limit indicated by the time limit information corresponding to the first identifier is a time after the current time when the first identifier conforming with the confirmatory identifier is stored in the management storage section 13 (step S321 in FIG. 5). If the present time is after the validity time limit (the decision at step S321 is NO in FIG. 5), the manager 12 of the management apparatus 10 informs the game device 20 that the validity time limit is expired, and in turn, the controller 29 of the game device 20 causes a display device (not shown) to show a message that indicates the present time is after the validity time limit (for example, as shown in FIG. 5, "validity time limit is expired"). Then, the process related to the validity time limit prolongation ends (in FIG. 5, from step S223 to END). In this case, the effect of affirmative authentication for the card ID number is discontinued, and therefore, the authentication flag shown in FIG. 6 is turned from one to zero (not shown in FIG. 5). Thus, the characteristics of the authenticated information set that was given to the card ID number (and the corresponding password) is deleted, the set of the card ID number and the corresponding password is returned to have only the characteristics of a registered information set.

Although not shown, if a card ID number (first identifier) coinciding with the card ID number read by the in-terminal acceptor 21 (confirmatory identifier) is not stored in the management storage section 13, the manager 12 of the management apparatus 10 informs that the card ID number is unknown, and in turn the controller 29 of the game device 20 causes the display device (not shown) to show a message indicating that the card has not been authenticated in order to prompt the player to proceed with the authentication of the card. Then, the process related to the validity time limit prolongation ends.

At step S321, if the current time is before the validity time limit (the decision at step S321 is YES in FIG. 5), then the management apparatus 10 inquires about a "game status" of the game device 20 that issued the aforementioned inquiry (step S322 in FIG. 5). Upon reception of this, the game device 20 returns the "game status" corresponding to the inquiry (step S224 in FIG. 5). Although not shown, if the present time is before the validity time limit, the manager 12 of the management apparatus 10 informs the game device 20 that the present time is before the validity time limit.

Since insertion of the card C by the user triggers the inquiry from the game device 20, there is a high probability that the game device 20 is still accepting some kind of manipulations from the user (see the dashed line oval blocks in FIG. 5). The manipulations may include manipulations for causing the game device 20 to serve the play (more specifically, pushing the game start button, etc.) and various manipulations necessary for enjoying the game. However, directly after inserting the card C, the user may change his mind and extract the card C.

The term "game status" includes specific situations, such as, what kind of manipulation is being carried out, or how is the progress status of the game per se (for example, the number of consumed medals, the number of earned medals, the earned score in the game).

As a result of synthesized evaluation of the specific situations, the determiner 15 of the management apparatus 10 determines whether the game device 20 is "in play" or not (step S323 in FIG. 5). The criteria for determining whether or not the device is "in play" have been described above.

If the decision negates the "in play" status, the process returns to step S321 to confirm whether or not the validity time limit for the card ID number is expired (in FIG. 5, from step S323 via NO to step S321). Afterward, the above steps are repeated (of course, the present time changes due to actual passage of time). When the negation of "in play" at step S323 is repeated and when the present time is after the validity time limit, step S223 is executed, and the process related to the validity time limit prolongation ends.

On the other hand, at step S323, if the "in play" status is affirmative (the decision at step S323 in FIG. 5 is YES), the validity time limit for the card ID number of the card C currently inserted into the game device 20 is prolonged (step S324 in FIG. 5).

Figure 7:
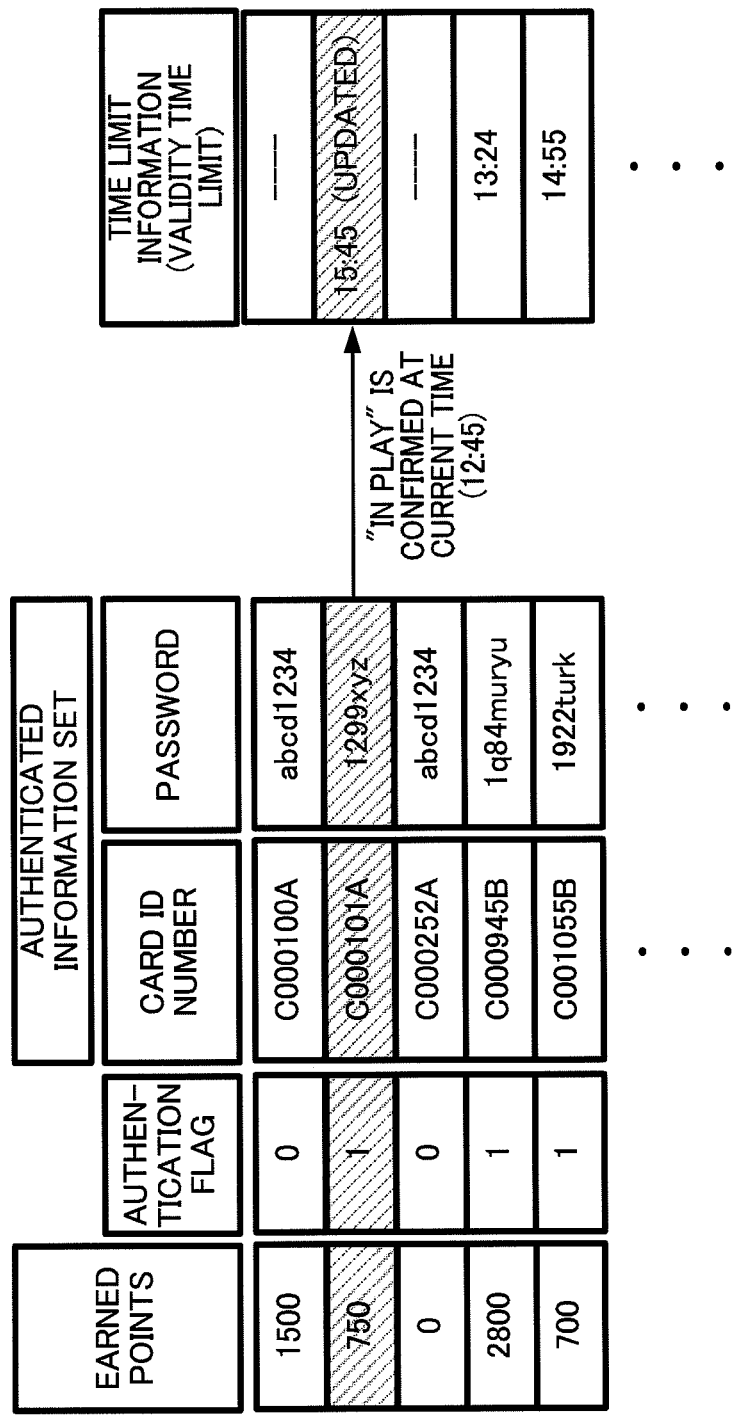
FIG. 7 is an explanatory diagram for explaining an example in which the validity time limit indicated by the time limit information is prolonged as a result of the process shown in FIG. 6.

An example of the result of the validity time limit prolongation is shown in FIG. 7. For FIG. 7, let us assume that the present time is "12:45". In the example of FIG. 7, a card C in which the card ID number "C000101A" is recorded has been inserted into the card holder 21C of one of the game devices 20A, 20B, 20C, . . . , and the game device 20 is confirmed to be "in play" at the present time (12:45), the former validity time limit (15:30) is updated to a new limit (15:45) (compare FIG. 7 with FIG. 6). In other words, the validity time limit is prolonged by 15 minutes.

After prolongation of the validity time limit, it is confirmed again whether or not the current time progressing due to actual passage of time is before the validity time limit for the card ID number (in FIG. 5, from step S324 to step S321). In this case, the "validity time limit" is, of course, the prolonged or updated validity time limit.

Afterward, insofar as the card C is inserted into the card holder 21C of the game device 20, the above-described steps are repeated.

Thus, insofar as "in play", the validity time limit is automatically prolonged. Simultaneously, the game device 20 continues game implementation for actual play. Accordingly, the user is not required to perform any special manipulation with respect to the prolongation of the validity time limit, and can enjoy the game without disturbance (see "manipulations, etc." by the user after step S224 in FIG. 5). Irrespective of whether or not the game device is "in play", as long as the present time is before the validity time limit, the user is not required to perform any special manipulation with respect to the prolongation of the validity time limit.

In this embodiment, in parallel to the game implementation, the permitter 17 of the management apparatus 10 permits execution of a service for the user, in which the service corresponds to the user (and is unique to the card ID number) at step S32A in FIG. 5. As described above, in this embodiment, the service is giving points depending on the amount of play, which is determined depending on, for example, the number of medals consumed or earned. For example, predetermined points are given to the user or the card ID number corresponding to the user each time the number of medals consumed or earned, which can be known as a result of the inquiry of the game status at step S322, reaches a predetermined number.

In FIGS. 6 and 7 to which reference was made above, examples of giving points are shown. As shown in FIG. 6, when the authentication is made, the earned points are 500 for the user of which the card ID number is C000101A. Depending on the playing of the game, the earned points increase to 750 as shown in FIG. 7. As shown in the drawings, the earned points can be stored semipermanently in the management storage section 13 or an external storage device together with the registered information set consisting of the card ID number and the password.

With respect to this, FIG. 1 suggests that the service providing device for executing the service can exist separately from the management apparatus 10 and the game device 20. However, the service providing device may be located in the management apparatus 10, and in this example, the service providing device can be considered to be the controller 19 or the manager 12 of the management apparatus 10.

The feature of the providing of the service in the embodiment is that the risk of misidentification of the user to which the service is provided by the game system 100 is significantly less although the user is not required to enter the password in the game device 20 as described above. This is because the authentication process has already been executed in which input of an appropriate password corresponding to the card ID number is confirmed (step S312 in FIG. 4), and therefore if the card ID number currently read by the card holder 21C is confirmed to be identical to a card ID number which already has the characteristic of the authenticated information set, identification of the user can be regarded as being confirmed.

In FIG. 5, parenthesizing the whole of step S32A means that permission of executing service may be conducted at irregular intervals. In this embodiment, for permission of executing service, a requirement [α] that the check results by the manager 12 in response to the inquiry at step S222 are affirmative, and a requirement [β] that the card C is continuously held in the card holder 21C are basically needed. The requirement [β] is satisfied when the continuous or repeated check results by the manager 12 in response to the continuous or repeated inquiry made by the inquiry maker 22 premised on the continuous or repeated reading of the card ID number at the card holder 21C are affirmative. Therefore, the requirement [β] is satisfied when the requirement [α] is satisfied continuously or repeatedly. In this embodiment, it is possible to utilize a further requirement [γ] as a requirement for permission of executing service. The requirement [γ] may depend on the game status, such as the number of medals consumed or earned (especially, arriving at the predetermined number). The parentheses in FIG. 5 or the fact that the service may be executed at odd intervals means that the requirement [γ] has such a feature. It is contemplated that although the requirements [α] and [β] are satisfied, unless the requirement [γ] is satisfied, the service (in this case, e.g., giving points) may not be executed actually. As mentioned above, in the embodiment, in order to execute the service during playing of the game, the user should maintain the card C held in the card holder 21C.

If the cards C are inserted into two or more among the multiple game devices 20A, 20B, 20C, . . . , the management apparatus 10 confirms whether or not each game device is in play, in which such confirmation is made in parallel or in sequence for the multiple game devices. Then, the management apparatus 10 confirms whether or not the validity time limit is expired for each card C (prolongs the validity time limit if the requirements are satisfied, and gives points as execution of service if the requirements are satisfied), in which such confirmation is made in parallel or in sequence for the multiple cards.

The game system 100 of the embodiment that has the structure and operates as has been described above yields the following effects.

First, according to the game system 100 of the embodiment, although security for preventing misidentification of a user who is the subject that can enjoy service is ensured, convenience in that users are not required to enter their passwords at the game devices 20 is achieved.

This advantage will be described with reference to FIGS. 8 and 9.

Figure 8:
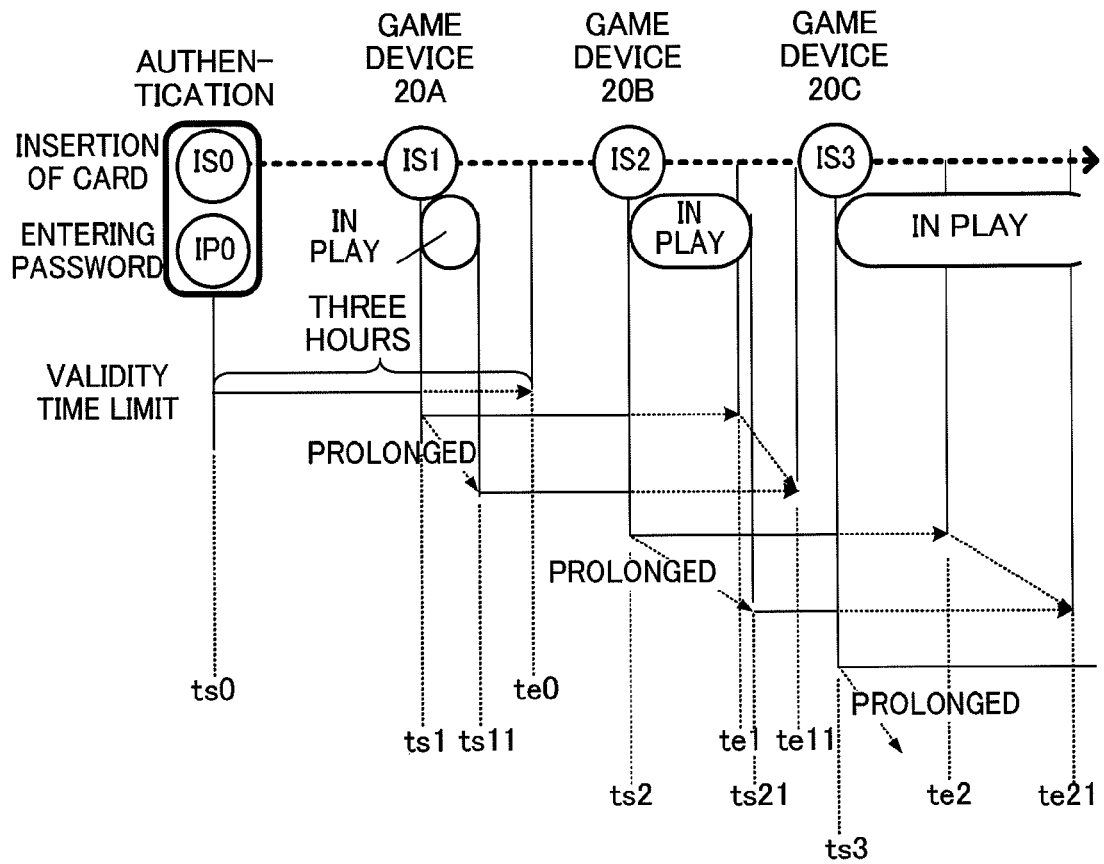
FIG. 8 is a conceptual diagram for showing acts required of the user with the passing of time for the authentication and playing of the game provided by the game device.

FIG. 8 is a conceptual diagram for showing acts required of the user with the passing of time for the authentication and playing the game provided by the game device 20, such that provision of service may be permitted in the embodiment. As shown in FIG. 8, in order that the user be authenticated, the user is required to perform an act of insertion of the card in the acceptor 11 of the management apparatus 10 (IS0) and to perform an act of entering the password (IP0). However, if the two acts have been performed, in order to enjoy the game provided by the game device 20 in such a manner that provision of service can be permitted (execution of service can be accepted), the user is only required to perform acts of insertion of the card in the in-terminal acceptor 21 of the game device 20 (IS1, IS2, IS3, . . . ). This is enabled by the validity time limit uniquely associated with the card ID number being automatically prolonged as described above. More specifically, as shown in FIG. 8, at time point ts0 of the authentication at the management apparatus 10, the validity time limit is set to be time point te0 that is three hours after time point ts0. Afterward, if the user starts the game at the game device 20A, the validity time limit is continuously prolonged as long as the user is in play (see the changes from time points ts1 and te1 to time points ts11 and te11). Even if the user changes the game by visiting the game device 20B and the game device 20C, the validity time limit is prolonged similarly (see the changes from time points ts2 and te2 to time points ts21 and te21).

Figure 9:
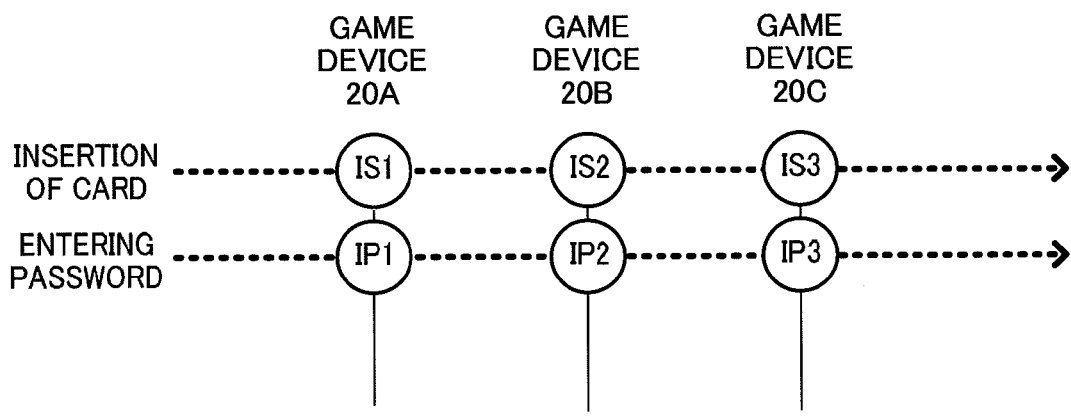
FIG. 9 is a conceptual diagram for showing an example to be compared with that in FIG. 8.

In contrast, as shown in FIG. 9, in an example in which the validity time limit is not prolonged, each game device 20 will require two kinds of acts of insertion of the card and entering the password (IS1, IP1, IS2, IP2, IS3, IP3, . . . ) in sequence. Obviously, this is remarkably troublesome. However, if entering of the password is not required, there will be a high probability of misidentifying the subject who can enjoy service (in this case, a finder or stealer of the card may accept the service without prior consent). That is to say, the security is not ensured. To avoid these undesirable situations, it would be almost necessary to enter the password at each game device 20.

Thus, the game system 100 of the embodiment can accomplish simultaneously two effects that are in a trade-off relationship, i.e., ensuring security and enhancing convenience.

Advantages of the embodiment can be contemplated in other points of view.

First, in this embodiment, it is not necessary to provide in the game device 20 an element for accepting entering passwords (see FIG. 1, an element corresponding to the second acceptor 112 is unnecessary). This is because as described in conjunction with FIG. 8, in this embodiment, it is unnecessary to enter the password at each game device 20. Thus, the embodiment can reduce the cost of the overall game system 100. However, in the present invention, it is not intended to exclude an embodiment in which the game device 20 includes an element for entering passwords. If there is a game device having an element for entering passwords in the game system 100, the element that will never be used will not encumber the operation. Even in such a case, the above-described effect of the convenience of users is unchanged.

Secondarily, a game device for providing a particular kind of game (for example, a coin pusher game machine) is not designed to accept passwords. In this embodiment, since it is not required to enter passwords at the game devices as described above, even if the game system 100 encompasses such a coin pusher game machine (or includes a game device that can accept entering passwords and another game device that cannot accept entering passwords), providing of service is not encumbered. In terms of this, in the game system 100 of the embodiment, the constitutive game device is not limited in structure and type, and may be selected freely.

While an embodiment of the present invention has been described above, it is not intended to limit the game device according to the present invention to the above-described embodiment, and various modifications may be made.

(1) In the above-described embodiment, the permitter 17 is a part of the management apparatus 10, but the present invention is not limited to the embodiment.

Figure 10:
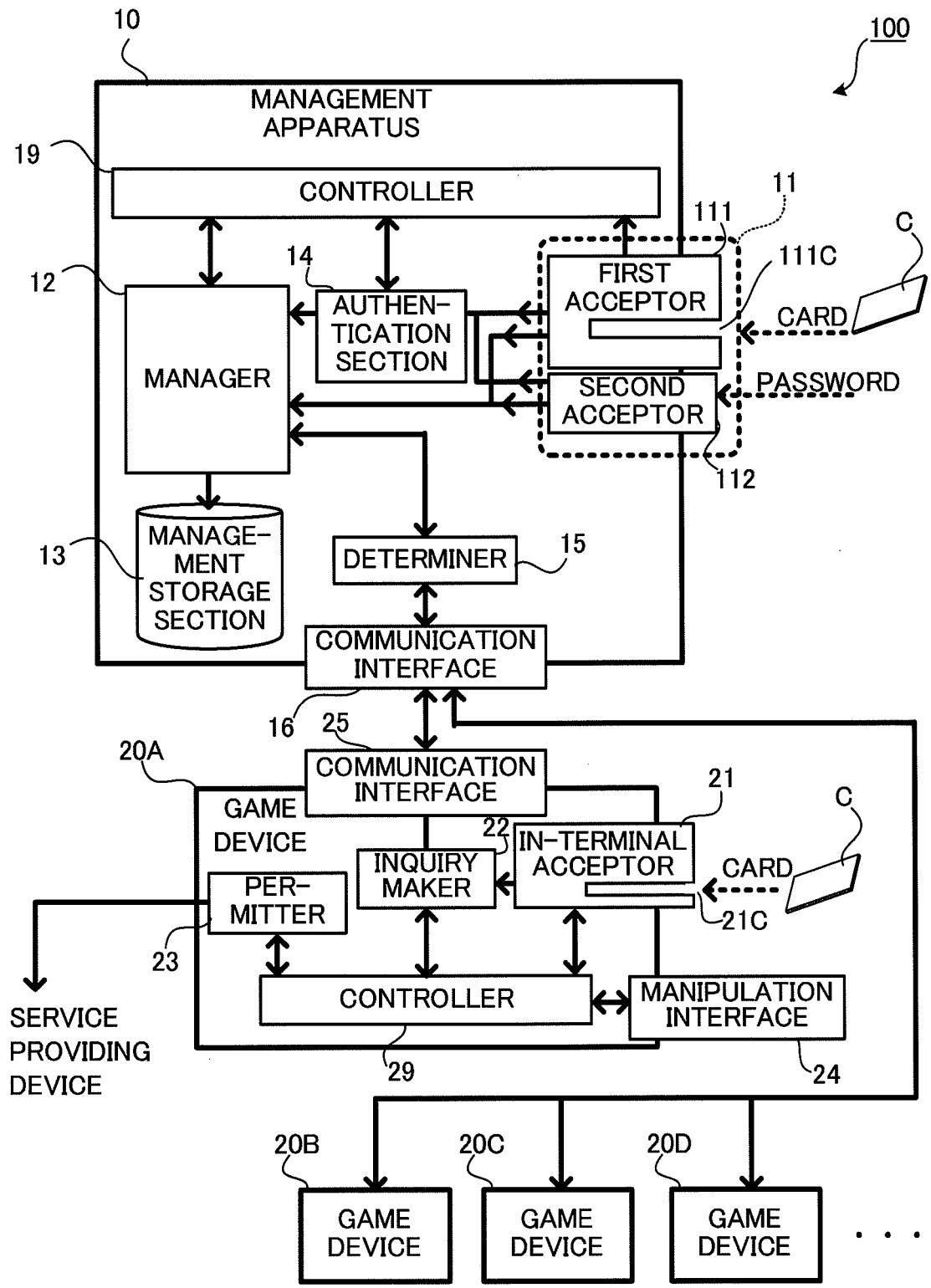
FIG. 10 is a block diagram showing a structure of a game system 100 according to another embodiment of the present invention.
Figure 11:
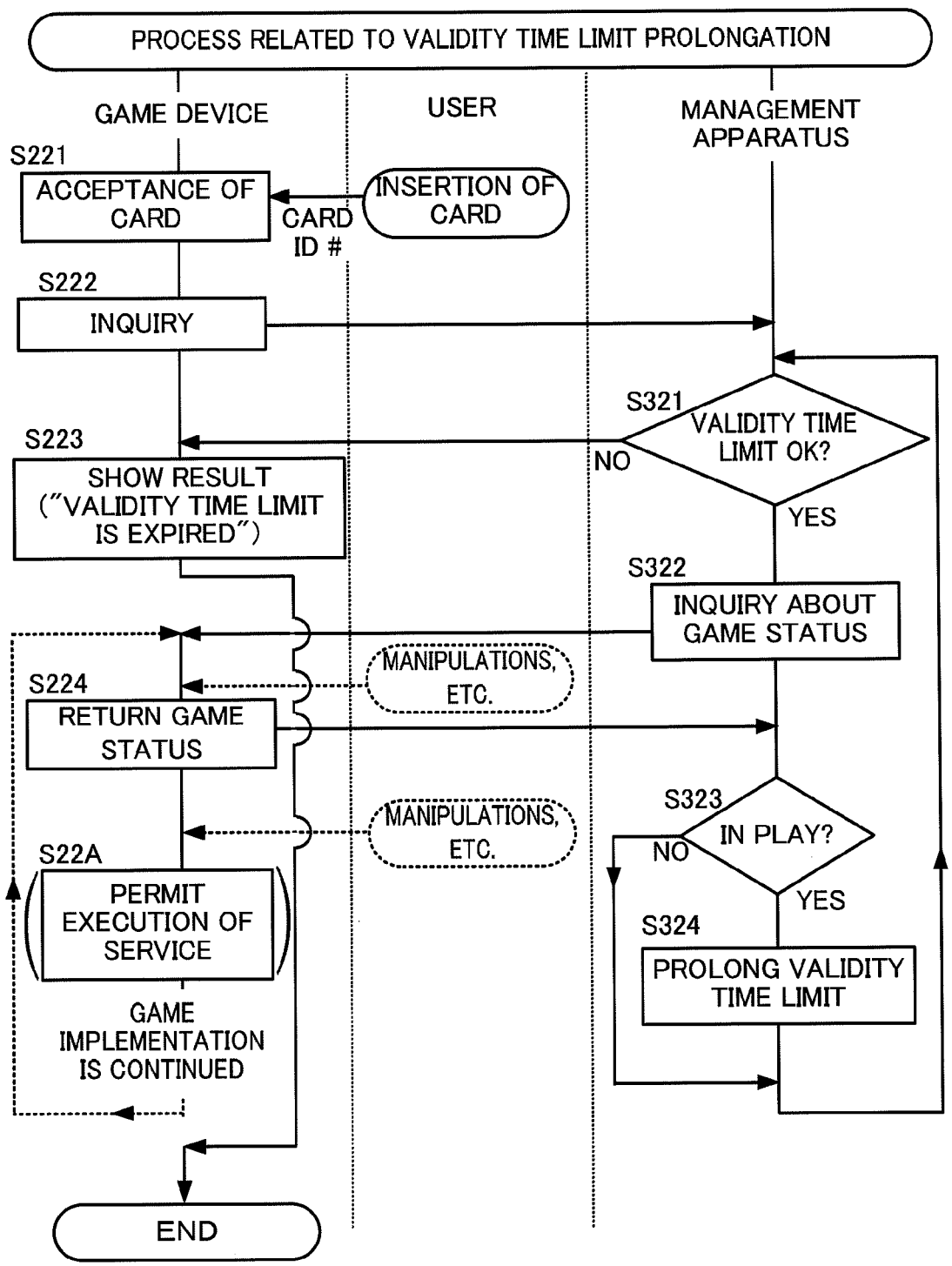
FIG. 11 is a flow chart showing a process related to a validity time limit prolongation, similar to that of FIG. 5, in the game system shown in FIG. 10.

For example, an embodiment in which a similar permitter 23 is a part of the game device 20 as shown in FIG. 10, and in which the game device 20 determines whether or not service should be executed as shown in FIG. 11 falls within the present invention. This arrangement is preferable since the permitter 23 in the game device 20 can determine whether or not service should be executed on the basis of the type of service. As described above, the "service" in the present invention may include a privilege depending on the type of game provided by the game device 20, or restitution to the game progress status until which a user enjoyed. This service is closely related to the type of game provided by the game device 20. Consequently, it is preferable that the game device 20 have the authority of deciding permission of execution of service in light of reduction in burden at the management apparatus 10 by distributed processing, and reduction in total traffic between the management apparatus 10 and the game device 20 (However, of course, it is not intended to exclude the embodiment in which the permitter 17 in the management apparatus 10 makes a decision from the present invention even though the planned service is closely related to the type of game provided by the game device 20).

In connection with this, in a manner similar to FIG. 1, FIG. 10 suggests that a service providing device for providing service may be located separately from the management apparatus 10 and the game device 20. However, the service providing device may be located in the management apparatus 10 or the game device 20. In an example, in which the permitter 23 is located in the game device 20, it is preferable that the service providing device be also located in the game device 20. In this example, the service providing device can be considered as the controller 29 of the game device 20.

(2) In the above-described embodiment, the card ID number and the password are used to confirm the identity of the user, and the "first identifier" and the "confirmatory identifier" of the present invention are the card ID number, whereas the "second identifier" of the present invention is the password. However, the present invention is not limited to the embodiment.

(2-1) For example, the "first identifier" of the present invention may be a piece of biological information, such as the physiognomy, voice, fingerprint, pattern of the iris, or pattern of the veins. In this case, for example, a combination of the biological information and the password identify a particular user. Furthermore, the "first identifier" may be a unique password. In this context, the unique password means a password that can be used by only one person, rather than a password that can be common to multiple users as a result of free decisions by users as in the above-described embodiment (see lines 1 and 2 of FIG. 2, etc.).

(2-2) Furthermore, instead of the card C on which a card ID number is recorded, other types of information recording medium on which an ID number, i.e., a medium identifier, is recorded can be used. In this case, instead of the card holder 111C and the card holder 21C, other types of information recording medium holder may be used.

(2-3) The manager 12 of the management apparatus 10 may store in the management storage section 13 an identification code having a type different from but corresponding to the card ID number (medium ID number) as the first identifier, instead of the card ID number (medium identifier) itself read by the first acceptor 111. Such an "identification code" should be generated to uniquely identify the information recording medium, similarly to that for the medium identifier.

It is possible to provide an ID management server (not shown) that stores sets, each of which includes a medium ID number and an identification code that correspond to a single information recording medium. In the registration process and the authentication process, when the first acceptor 111 of the management apparatus 10 reads the medium ID number, the management apparatus 10 makes a request to the ID management server for the identification code corresponding to the medium ID number. In response to the request, the ID management server returns the identification code (first identifier) to the management apparatus 10 (these actions are conducted without being recognized by the user). In the registration process, the manager 12 of the management apparatus 10 stores a set of the identification code (the first identifier) received from the ID management server and the second identifier obtained by the second acceptor 112 in the management storage section 13. In the authentication process, the authentication section 14 of the management apparatus 10 confirms whether or not the set of the identification code (the first identifier) received from the ID management server and the second identifier obtained by the second acceptor 112 is in accord with a set of an identification code (the first identifier) and a second identifier that has been already registered in the management storage section 13.

In the inquiry from the game device 20 to the management apparatus 10, when the in-terminal acceptor 21 of the game device 20 reads the medium ID number, the controller 29 of the game device 20 makes a request to the ID management server for the identification code corresponding to the medium ID number. In response to the request, the ID management server returns the identification code (confirmatory identifier) to the game device 20 (these actions are conducted without being recognized by the user). Thus, the controller 29 of the game device 20 serves as a confirmatory identifier acquirer for acquiring a confirmatory identifier corresponding to a user. The inquiry maker 22 of the game device 20 makes an inquiry involving the identification code (confirmatory identifier) received from the ID management server to the management apparatus 10. In response to the inquiry, the manager 12 of the management apparatus 10 checks whether or not an identification code (first identifier) matching the identification code (confirmatory identifier) is stored in the management storage section 13, and checks whether or not the validity time limit indicated by the time limit information corresponding to the first identifier is after the present time if a first identifier matching the confirmatory identifier is stored in the management storage section 13.

(2-4) The "second identifier" of the present invention may be any one of the above-described pieces of biological information, unique password, or other type of identifier, instead of the password in the embodiment.

(3) In the above-described embodiment, when the validity time limit can be prolonged, the new validity time limit is set to three hours after the present time. However, the present invention is not limited to the embodiment. In the present invention, the validity time limit can be prolonged in accordance with any one of the following various schemes.

First, the extended amount of time is not limited to three hours, and may be shorter or longer.

Second, in the above-described embodiment, the validity time limit is prolonged when two requirements are satisfied (when the results of checks by the manager 12 in response to the inquiry are affirmative and when the device is in play. In the present invention, the validity time limit may be prolonged when the former requirement is satisfied. More specifically, for example, a process shown in FIG. 12 may be used. The game device 20 makes an inquiry (step S222 in FIG. 12), and if the results of checks by the manager 12 in response to the inquiry are affirmed (i.e., the present time is before the validity time limit, and the decision at step S321 in FIG. 12 is YES), the validity time limit is prolonged instantly (step S324 in FIG. 12). In this case, after checks by the manager 12 in response to an inquiry from a particular game device 20, as long as play is continued at the game device 20, the validity time limit is no longer prolonged (in FIG. 12, from step S324 to END). However, in the present invention, the number of times of inquiries is not limited to one for each game device 20. Accordingly, if the inquiries are made at multiple appropriate times, the validity time limit may be prolonged at multiple times.

The embodiment shown in FIG. 12 and the embodiment shown in FIG. 5 may be used simultaneously. In such an integral embodiment, when the result of inquiry is affirmative, the validity time limit is prolonged. Also, when the device is confirmed to be in play in addition to the requirement in which the result of inquiry is affirmative is satisfied, the validity time limit is prolonged again. In such a case in which the validity time limit is prolonged at multiple times, the extended amount of time may be set separately for respective times. For example, it may be three hours at the former prolongation, whereas it may be 10 minutes at the latter prolongation (An alteration of the requirement for prolonging the validity time limit will be described in section (4-4)).

Third, in the above-described embodiment, the "validity time limit" is designated as the time of day, and the management storage section 13 stores the time of day as the validity time limit (for example, "15:30" in FIG. 6, and "15:45" in FIG. 7). However, in the present invention, the management storage section 13 may store the present time of day (time of updating) at updating. In this case, the "validity time limit" is regarded as a predetermined length of time after the present time (the basic concept is the same as that in the above-described embodiment). The requirements for "updating" can be regarded as the same as the requirements for prolonging the validity time limit in the above-described embodiment (affirmation of the results of checks in response to the inquiry, etc.). Consequently, updating the present time can be regarded as prolonging the validity time limit.

The "present time" once recorded is maintained with the passing of actual time until it is updated (in other words, the "present time" becomes a "past time" with the passing of actual time). If the "present time" is not updated (i.e., if the validity time limit is not prolonged), the validity time limit is expired when the predetermined length of time has passed in the actual time.

In the present invention, the term "time limit information indicating the validity time limit" (especially, "indicating") should be construed to include the above-mentioned meaning.

Fourth, the "validity time limit" may be designated as a remaining time that reduces and stops in accordance with a rule. More specifically, the following scheme may be used.

First, a remaining time of a predetermined length (for example, seven hours) is given to a user after the authentication process. In this case, the validity time limit is seven hours after the finish time of the authentication process (the present time). The actual time passes regardless of playing the game by the user. The remaining time reduces with the passing of actual time unless satisfaction of the requirements, i.e., affirmation of the results of checks by the manager 12 in response to the inquiry and affirmation of the "in play" status as similar to the embodiment shown in FIG. 5. For example, if the user does not play continually for three hours, the remaining time becomes four hours that is the result of seven minus three. In this case, the validity time limit is four hours after the present time that is three hours after the finish time of the authentication process. On the other hand, if the results of checks by the manager 12 in response to the inquiry are affirmative and the "in play" status is affirmative, reduction of the remaining time is stopped. For example, when the initial remaining time is four hours, and when the user plays for two hours, the available time is still four hours. This means that the validity time limit is prolonged (or continuously prolonged) while the user is the "in play" status.

In this case, the difference to the above-described embodiment is only the value to be stored in the management storage section 13, and more specifically, the reducing available time is the subject to be stored.

In the present invention, the term "time limit information indicating the validity time limit" (especially, "indicating") should be construed to include the above-mentioned meaning.

(4) In the above-described embodiment, the execution of service is permitted when three requirements [α] to [γ] are satisfied, i.e., [α] affirmation of the results of checks by the manager 12 in response to the inquiry, [β] continuous holding of card C, and [γ] requirement on the basis of the game status. However, the present invention is not limited to the embodiment.

(4-1) In the present invention, the execution of service may be permitted when at least only requirement [α] is satisfied. When the results of checks by the manager 12 in response to the inquiry are affirmative, there is little risk of misidentifying the user to whom service should be provided.

(4-2: Requirements for Permission of Service Execution and Type of Service)

Requirements for permission of service execution may be decided depending on the type of service to be provided and the manner for inputting the "the first identifier" and the "confirmatory identifier".

For example, if the service is closely related to the particular type of game as described in conjunction with "permitter 23" in section (1), in the above-described embodiment, it is not appropriate to omit requirement [β]. This is because when requirement [β] is satisfied, there is a high probability that the user is playing the game provided by the game device 20 (the same is true of the embodiment in which the service is giving points depending on the amount of play).

On the other hand, in a case of providing such a service, requirement [γ] may be meaningless. For example, if the service is restitution to the game progress status, when the user wants to start playing the game the first time, there is no game progress status, and therefore it is meaningless to consider the game progress status. Accordingly, if only requirements [α] and [β] are satisfied, service may be provided, in which the service is giving a special item used in the game or giving information on tricks.

(4-3: Requirements for Permission of Service Execution and Type of Input of Confirmatory Identifier)

As mentioned above, there may be a situation in which requirement [β] is needed. However, there may be another situation in which requirement [β], i.e., affirmation of continuous holding of card C is meaningless. Such a situation is, for example, that inputting "confirmatory identifier" is realized by an instantaneous contact of the card with the reader (more specifically, the card C is a contactless IC card, such as close-coupling type, proximity type, vicinity type, etc., or realized by using a piece of biological information as mentioned in section (2), rather than holding the card C by the card holder 21C. In this case, requirement [β] may be basically omitted.

However, if the "confirmatory identifier" is input in one of the manners mentioned above, instead of requirement [β], another requirement [β'] may be preferably used for deciding whether service should be executed or not. Requirement [β'] may be inputting the confirmatory identifier at a game device 20 before passing a predetermined period after the authentication process, or starting play at a game device 20 before passing a predetermined period after inputting the confirmatory identifier at the game device 20. This is because when requirement [β'] is satisfied, there is a high probability that the user is playing the game provided by the game device 20.

In this respect, if inputting "confirmatory identifier" is realized by a contactless IC card or a unique password as mentioned above, it will be possible that the results of checks by the manager 12 in response to the inquiry from a game device 20 are affirmative, whereas the results of checks by the manager 12 in response to the inquiry from another game device 20 are also affirmative. This may occur when the contactless IC card is borrowed or stolen or when the unique password is given to or spied by an improper user. In such a case, it would be possible to permit execution of service at both of the two game devices 20, but it is preferable to permit execution of service at either one of the two game devices 20. In such a preferable modification, a double execution of service is prevented, and especially illegitimate enjoyment of service is prevented. In this modification, it is necessary to decide a game device 20 for which execution of service should be permitted, and the criteria for deciding it can be selected freely (for example, provision of service may be permitted for only the game device that has made the inquiry first among the inquiries of which the check results are affirmed by the manager 20.

(4-4: Requirements for Permission of Service Execution and Requirements for Prolongation of Validity Time Limit)

Requirement [β] for permission of execution of service (continuous holding of the card C) is closely related to the requirement for prolonging the validity time limit, i.e., decision that the game device is in play. Accordingly, requirement [β] for permission of execution of service may be replaced with a decision that the game device is in play, except for the decision about continuous holding of the card C. Alternatively, the requirement for prolonging the validity time limit may be replaced with requirement [β] (continuous holding of the card C).

More generally, the decision whether or not the validity time limit should be prolonged may depend on satisfying at least one of the three requirements [α] to [β], and the other requirement stated in section (4-3).

(5) In the above-described embodiment, insertion of medals is the requirement for playing the game. However, instead of medals, it is possible to use credit values recorded on recording media, such as prepaid cards, carried by users, or recorded on a fixed recording medium located in any one of devices in the game system 100. That is to say, instead of dropping in medals, reduction of the credit value may give the user a qualification to participate the game as a player. The recording medium carried by the user on which the credit value is recorded may be, for example, the card C.

(6) In the above-described embodiment, it is decided whether or not the game device is in play depending on whether medals are consumed or not. However, it is possible to decide whether or not the game device is in play depending on whether the credit is consumed or not. Consumption of credit means a fact that the credit is reduced and cannot be returned to the user, and that the participation in the game is fixed.

(7) The number of medals consumed in the above-described embodiment may be considered to be replaced with the amount of consumption (i.e., amount of reduction) of the credit. Accordingly, the above-mentioned "amount of play" may vary depending on the amount of consumption (i.e., amount of reduction) of the credit.

(8) In the above-described embodiment, multiple medals are paid to the user as a reward for play. However, as a reward for play, the game device 20 may pay another medium used in the game to the player. For example, it is possible to add to the credit an amount indicating medals as a reward (a number equivalent to the number of medals as the reward).

Alternatively, the game device 20 may pay a ticket as the reward.

If the game device 20 is a coin pusher game machine, the coin pusher game machine may throw balls as the reward into the pusher table (field) of the coin pusher game machine. For example, the ball is transferred to a ball lottery device upon falling from the pusher table by pushing of the reciprocating medal pusher (or coin pusher). The ball lottery device physically conducts lottery depending on whether or not the ball enters a predetermined winning slot. If the player wins at the physical lottery (if the ball enters the predetermined winning slot), more medals, credits, or tickets are paid.

As described above, the reward for play may be in the form of medium (medals or credits) used in the game that is consumed by the player to participate the game, and may be in another form of medium (tickets or balls) used in the game.

(9) The number of medals earned in the above-described embodiment may be deemed to be replaced with the amount of the earned reward (for example, the amount added to the credit, the number of tickets or the number written in a single ticket, or the number of balls). Accordingly, the above-mentioned "amount of play" may vary depending on the amount of the earned reward.

The above-described modifications can be combined unless they conflict.

REFERENCE SYMBOLS

| | |
|---|---|
| 100: game system, | 10: management apparatus, |
| 11: acceptor, | 111: first acceptor, |
| 111C: card holder, | 112: second acceptor |
| 12: manager, | 13: management storage section |
| 14: authentication section | |
| 15: determiner, | 16: communication interface |
| 17: permitter, | 19: controller |
| 20 (20A, 20B, 20C, 20D): game device | |
| 21: in-terminal acceptor (confirmatory identifier acquirer) | |
| 21C: card holder (recording medium holder) | |
| 22: inquiry maker, | 24: manipulation interface |
| 25: communication interface | |
| 29: controller (confirmatory identifier acquirer) | |
| C: card (recording medium) | |

The invention claimed is:

1. A game system comprising a management apparatus and a game device, the management apparatus comprising:
an authentication section adapted for obtaining results of authentications using a set of first identifier and second identifier corresponding to a user; and
a manager, implemented by a processor, adapted for storing into a management storage section the first identifier and time limit information indicating a validity time limit associated with the first identifier when the results of the authentications are affirmative, the manager adapted for storing a plurality of first identifiers in the management storage section and searching for the first identifier among the plurality of first identifiers by checking memory in the management storage section in response to an inquiry from the game device, the game device comprising:
a confirmatory identifier acquirer adapted for acquiring a confirmatory identifier corresponding to the user;
an inquiry maker adapted for making an inquiry asking the manager to check whether or not the first identifier conforming with the confirmatory identifier is stored in the management storage section, the inquiry asking the manager to check whether or not the validity time limit indicated by the time limit information corresponding to the first identifier is a time after the present time when the first identifier conforming with the confirmatory identifier is stored in the management storage section; and
a permitter adapted for permitting execution of a service associated with the first identifier used in the inquiry by the inquiry maker when results of checks by the manager in response to the inquiry are affirmative,
wherein the set of the first identifier and the second identifier is given to the management apparatus by manipulation at a first input device at the management apparatus by the user, and the confirmatory identifier is given to the game device by manipulation at a second input device at the game device by the user.

2. The game system according to claim 1, wherein the manager is adapted for updating the time limit information such that the validity time limit indicated by the time limit information with respect to the first identifier is prolonged when a predetermined requirement is satisfied with respect to the first identifier.

3. The game system according to claim 2, wherein the predetermined requirement includes a fact that the results of checks by the manager in response to the inquiry for the first identifier are affirmative.

4. The game system according to claim 2, further comprising a determiner adapted for determining whether or not the game device is in play, wherein the predetermined requirement includes:
a fact that the results of checks by the manager in response to the inquiry for the first identifier are affirmative, and
a fact that the determiner determines that the game device that accepts entering the confirmatory identifier matching the first identifier is in play.

5. The game system according to claim 2,
wherein the game device comprises a recording medium holder adapted for holding a recording medium on which a recording medium identifier corresponding to the confirmatory identifier or the confirmatory identifier is recorded,
wherein the predetermined requirement includes a fact that the recording medium is held in the recording medium holder, and
wherein the permitter is adapted for permitting execution of the service if the results of checks by the manager in response to the inquiry are affirmative and if the recording medium is held in the recording medium holder.

6. The game system according to claim 1, further comprising a plurality of the game devices, wherein if the results of checks by the manager in response to the inquiry made by the inquiry maker of each of at least two game devices are affirmative, the permitter is adapted for permitting execution of the service corresponding to the first identifier used in the inquiry by only one game device among the at least two game devices.

7. The game system of claim 1, wherein the management apparatus is a server external to the game device.

8. The game system of claim 1, wherein the management apparatus and the game device are different devices connected through a network.

9. The game system according to claim 1, wherein the manager is adapted for updating the time limit information such that the validity time limit indicated by the time limit information with respect to the first identifier is prolonged when a determiner determines that the game device that accepts entering the confirmatory identifier matching the first identifier is in play.

10. The game system according to claim 1, wherein the validity time limit is an expiration time limit of a duration in which the authentications are effective.

11. The game system according to claim 1, wherein the manager is further adapted for storing in the management storage section, for each of the plurality of first identifiers, a respective time limit information indicating a validity time limit.

12. A game system comprising a management apparatus and a game device,
the management apparatus comprising:
an authentication section adapted for obtaining results of authentications using a set of first identifier and second identifier corresponding to a user; and
a manager, implemented by a processor, adapted for storing into a management storage section the first identifier and time limit information indicating a validity time limit associated with the first identifier when the results of the authentications are affirmative, the manager adapted for storing a plurality of first identifiers in the management storage section and searching for the first identifier among the plurality of first identifiers by checking memory in the management storage section in response to an inquiry from the game device,
the game device comprising:
a confirmatory identifier acquirer adapted for acquiring a confirmatory identifier corresponding to the user; and
an inquiry maker adapted for making an inquiry asking the manager to check whether or not the first identifier conforming to the confirmatory identifier is stored in the management storage section, the inquiry asking the manager to check whether or not the validity time limit indicated by the time limit information corresponding to the first identifier is a time after the present time when the first identifier conforming with the confirmatory identifier is stored in the management storage section,
the management apparatus further comprising
a permitter adapted for permitting execution of a service associated with the first identifier used in the inquiry by the inquiry maker when results of checks by the manager in response to the inquiry are affirmative,
wherein the set of the first identifier and the second identifier is given to the management apparatus by manipulation at a first input device at the management apparatus by the user, and the confirmatory identifier is given to the game device by manipulation at a second input device at the game device by the user.

13. The game system according to claim 12, wherein the manager is adapted for updating the time limit information such that the validity time limit indicated by the time limit information with respect to the first identifier is prolonged when a predetermined requirement is satisfied with respect to the first identifier.

14. The game system according to claim 12, further comprising a plurality of the game devices, wherein if the results of checks by the manager in response to the inquiry made by the inquiry maker of each of at least two game devices are affirmative, the permitter is adapted for permitting execution of the service corresponding to the first identifier used in the inquiry by only one game device among the at least two game devices.

15. The game system according to claim 12, wherein the validity time limit is an expiration time limit of a duration in which the authentications are effective.

16. A management apparatus comprising:
an authentication section adapted for obtaining results of authentications using a set of first identifier and second identifier corresponding to a user; and
a manager, implemented by a processor, adapted for storing into a management storage section the first identifier and time limit information indicating a validity time limit associated with the first identifier when the results of the authentications are affirmative, the manager adapted for checking memory in the management storage section in response to an inquiry from a game device,
wherein the manager is adapted for storing a plurality of first identifiers in the management storage section and searching for the first identifier among the plurality of first identifiers by checking whether or not the first identifier conforming with a confirmatory identifier is stored in the management storage section in response to an inquiry from the game device, the inquiry involving a confirmatory identifier corresponding to the user and is acquired at the game device,
wherein the manager is adapted for checking whether or not the validity time limit indicated by the time limit information corresponding to the first identifier is a time after the present time when the first identifier conforming with the confirmatory identifier is stored in the management storage section,
wherein the management apparatus sends check results of the manager to the game device, and
wherein the set of the first identifier and the second identifier is given to the management apparatus by manipulation at a first input device at the management apparatus by the user, and the confirmatory identifier is given to the game device by manipulation at a second input device at the game device by the user.

17. The management apparatus according to claim 16, wherein the validity time limit is an expiration time limit of a duration in which the authentications are effective.

18. A management apparatus comprising:
an authentication section adapted for obtaining results of authentications using a set of first identifier and second identifier corresponding to a user;
a manager, implemented by a processor, adapted for storing into a management storage section the first identifier and time limit information indicating a validity time limit associated with the first identifier when the results of the authentications are affirmative, the manager adapted for storing a plurality of first identifiers in the management storage section and searching for the first identifiers among the plurality of first identifiers by checking memory in the management storage section in response to an inquiry from a game device; and
a permitter adapted for permitting execution of a service associated with the first identifier used in the inquiry by the game device when results of checks by the manager in response to the inquiry are affirmative,
wherein the manager is adapted for checking whether or not the first identifier conforming with a confirmatory identifier is stored in the management storage section in response to an inquiry from the game device, the inquiry involving a confirmatory identifier corresponding to the user and is acquired at the game device,
wherein the manager is adapted for checking whether or not the validity time limit indicated by the time limit information corresponding to the first identifier is a time after the present time when the first identifier conforming with the confirmatory identifier is stored in the management storage section, and wherein the set of the first identifier and the second identifier is given to the management apparatus by manipulation at a first input device at the management apparatus by the user, and the confirmatory identifier is given to the game device by manipulation at a second input device at the game device by the user.

19. The management apparatus according to claim 18, and wherein the validity time limit is an expiration time limit of a duration in which the authentications are effective.

* * * * *